US012215842B1

(12) United States Patent
Yando

(10) Patent No.: US 12,215,842 B1
(45) Date of Patent: Feb. 4, 2025

(54) TRANSLUCENT DEVICES WITH LIGHT REFRACTORS AND REFLECTORS

(71) Applicant: W Schonbek LLC, Plattsburgh, NY (US)

(72) Inventor: Roslyn Yando, Brainardsville, NY (US)

(73) Assignee: W Schonbek LLC, Plattsburgh, NY (US)

( * ) Notice: Subject to any disclaimer, the term of this patent is extended or adjusted under 35 U.S.C. 154(b) by 0 days.

(21) Appl. No.: 18/353,601

(22) Filed: Jul. 17, 2023

(51) Int. Cl.
*F21V 13/04* (2006.01)
*F21V 5/04* (2006.01)
*F21V 7/00* (2006.01)

(52) U.S. Cl.
CPC .............. *F21V 13/04* (2013.01); *F21V 5/045* (2013.01); *F21V 7/0025* (2013.01)

(58) Field of Classification Search
CPC ........ F21V 21/104; F21V 13/04; F21V 13/14; F21W 2121/00
See application file for complete search history.

(56) References Cited

U.S. PATENT DOCUMENTS 8,342,718 B2 * 1/2013 Kikoski .................... F21V 5/00 362/311.06
2013/0088859 A1 * 4/2013 Wang ......................... F21V 3/04 362/244

OTHER PUBLICATIONS

U.S. Appl. No. 29/869,511, filed Jan. 3, 2023.
"8 Tips For Removing Barnacles From Your Boat's Hull", Boats.net Blog. Retrieved from the internet: https://www.boats.net/blog/boat-hull-barnacle-removal-tips, available at least as early as Oct. 21, 2022.
Pendant, designed by Reed Krakoff, 2018 Tiffany & Co. 2018 Blue Book Collection, 1 page, 2018.
Tahitian Pearl & Diamond Necklace, 1 image, 1 page, available at least as early as Oct. 21, 2022.
Barnacles, 3 images, 1 page, available at least as early as Oct. 21, 2022.

* cited by examiner

*Primary Examiner* — Robert J May
(74) *Attorney, Agent, or Firm* — Heslin Rothenberg Farley & Mesiti P.C.

(57) ABSTRACT

A device comprises, for example, a base with a translucent portion having an outer surface, a plurality of refractors configured to refract incident light within a visible spectrum supported by the translucent portion, and a plurality of reflectors configured to reflect incident light within the visible spectrum supported by the translucent portion. The plurality of refractors and reflectors may comprise a first refractor coupled to the outer surface, a first reflector coupled to a refractor but not coupled to the outer surface, and a second reflector coupled to a refractor and another reflector but not coupled to the outer surface. Some of the refractors and reflectors may be coupled to the outer surface, and some of the reflectors may not be coupled to the outer surface. The refractors may comprise glass crystal, and be of different sizes. The reflectors may be spherical, and be of different sizes and/or hues.

29 Claims, 27 Drawing Sheets

TRANSLUCENT DEVICES WITH LIGHT REFRACTORS AND REFLECTORS

TECHNICAL FIELD

The present disclosure relates generally to devices configured to reflect and refract incident light, and more particularly, to devices with a translucent base portion and a plurality of light refractors and a plurality of light reflectors supported by the translucent base portion.

BACKGROUND

Many devices are configured to refract and/or reflect light, such as light in the visible spectrum. Such devices emanate and/or disperse light in various ways to create a particular visual experience. Light refraction and/or reflection devices may be configured to refract and/or reflect light for a variety of purposes, such as, but not limited to, for entertainment, ambiance, aesthetic/visual appeal and/or lighting purposes.

Light refraction and/or reflection devices are often associated with a light source, such as being configured as part of a light emitting device, configured to be used in conjunction with a light emitting device, or configured to be positioned relative to a light emitting device such that light emanating from a light emitting device is incident on the device (and thereby refracted and/or reflected by the device). As one non-limiting example, some current lighting fixtures are configured to emit light, and refract and/or reflect at least a portion of the emitted light. As other examples, some current novelty items, keepsakes, decorations/decor and/or entertainment devices are configured to refract and/or reflect incident light.

Devices which provide unique and visually appealing light refraction and/or reflection schemes are thereby desirable. Further, devices with a translucent portion and light refractors and reflectors, which are coupled with the translucent portion in a secure and low profile manner, that provides a significant amount of light refractions and reflections, are desirable.

While certain aspects of conventional technologies have been discussed to facilitate disclosure of Applicant's inventions, the Applicant in no way disclaims these technical aspects, and it is contemplated that the inventions may encompass one or more conventional technical aspects. Where an item of prior knowledge is referred to or discussed, such reference is not an admission that the item is publicly available, known to the public, part of common general knowledge, or otherwise constitutes prior art under the applicable statutory provisions; or is known to be relevant to an attempt to solve any problem with which this disclosure is concerned.

SUMMARY

The present inventions may address one or more of the problems and deficiencies of light refractive and/or reflective devices. However, it is contemplated that the inventions may prove useful in addressing other problems and deficiencies in a number of technical areas. Therefore, the inventions, and embodiments thereof, should not necessarily be construed as limited to addressing any of the particular problems or deficiencies discussed herein.

Shortcomings of the prior art are overcome and additional advantages are provided through a light refracting and reflecting device having, for example, a base and a plurality of light refractors and a plurality of reflectors supported by the base. Each refractor of the plurality of refractors is configured to refract incident light within the visible spectrum, and each reflector of the plurality of reflectors is configured to reflect incident light within the visible spectrum.

The plurality of refractors and reflectors may form an array, a covering or an "overgrowth" arrangement on one or more portions of the base. In some embodiments, the plurality of refractors and reflectors may be supported by a translucent portion (e.g., a transparent portion) of the base. At least some of the refractors and at least some of the reflectors may be in physical contact with the translucent portion.

In some embodiments, the translucent portion may be formed of glass. For example, the translucent portion may comprise glass crystal, and include a plurality of facets. The translucent portion, in some embodiments, may be configured as a refractor that refracts incident light within the visible spectrum. In some embodiments, the translucent portion may be prismatic. The translucent portion and the plurality of refractors and reflectors may be configured such that light passes to/therethrough a number of times, and thereby is reflected and/or refracted and scattered a number of times and passes to/between the plurality of refractors and reflectors and the translucent portion a number of times. The plurality of refractors and reflectors (and potentially the translucent portion) "bounce" incident light between the features, which may modify the light in various ways (e.g., in direction, speed, intensity, quality, spectrum, wavelength concentration/separation, etc.) to create a unique, complex, and visually appealing configuration.

The refractors may refract light that is transmitted/emanating from the translucent portion, at least one reflector and/or at least one other refractor, and/or the refractors may refract light such that the refracted light is transmitted to the translucent portion, at least one reflector and/or at least one other refractor. The refractors are translucent (potentially transparent), and may be prismatic. The refractors can be formed of glass, such as glass crystal, and may be faceted. In one exemplary embodiment, the refractors may be thin octagonal faceted glass crystals. The plurality of refractors may include a plurality of refractors of a first size and a plurality of refractors of a second size that differs from the first size. At least some of the plurality of refractors (and potentially all of the refractors) may be coupled to the outer surface of the base, such as to the outer surface of the translucent portion. In some such embodiments, a portion of a bottom side of a plurality of refractors may be coupled to the outer surface of the base/translucent portion. In some embodiments, at least one refractor of the plurality of refractors may not be coupled to the outer surface of the base/translucent portion. For example, a refractor may be coupled to another refractor and/or a reflector (that may or may not be coupled to the outer surface), and not itself coupled to the outer surface. The refractors can be coupled to the outer surface of the base/translucent portion, another refractor and/or a reflector via, for example, an adhesive (e.g., a translucent adhesive).

The reflectors may reflect light that is transmitted/emanating from the translucent portion, at least one refractor and/or at least one other reflector, and/or the reflectors may reflect light such that the reflected light is transmitted to the translucent portion, at least one refractor and/or at least one other reflector. The reflectors may be opaque (not translucent). In some embodiments, the plurality of reflectors may include a plurality of reflectors that have a first hue, and a plurality of reflectors that have a second hue that differs from the first hue. Each of the plurality of reflectors may be configured to be relatively highly reflective to light within the visible spectrum. For example, the reflectors may have a reflection factor/percentage of at least 50%, or at least 75%, to light within the visible spectrum. In some embodiments, the reflectors may be configured to have a relatively high specular reflectance to light within the visible spectrum. For example, the reflectors may have an absolute specular reflection factor/percentage of at least 50%, or at of at least 75%, to light within the visible spectrum. In some embodiments, the reflectors have a gloss of at least 20 GU, or at least 30 GU, at 60° to light within the visible spectrum. The reflectors may be formed of glass and acrylic, for example. In some embodiments, the reflectors may include a convex outer surface (e.g., arcuately convex). In one such embodiment, the reflectors are spherical. The plurality of reflectors may include a plurality of reflectors of a first size and a plurality of reflectors of a second size that differs from the first size. At least some of the reflectors (and potentially all of the reflectors) may be coupled to the outer surface of the base, such as the outer surface of the translucent portion. In some embodiments, at least one of the reflectors may not be coupled to the outer surface of the base/translucent portion. For example, a reflector may be coupled to a refractor and/or a reflector (that is coupled to the outer surface), and not itself coupled to the outer surface. The reflectors can be coupled to the outer surface of the base/translucent portion, another reflector and/or a refractor via, for example, an adhesive (e.g., a translucent adhesive).

In some embodiments, the light refracting and reflecting device may be utilized with a light emitting device to form a light emitting, refracting and reflecting system. The light emitting device may emit light within the visible spectrum (e.g., substantially white light), and the light refracting and reflecting device and the light emitting device may be configured such that light emitted from the light emitting device is incident on the outer surface of the base (e.g., the outer surface of the translucent portion), the plurality of refractors and/or the plurality of reflectors. The light refracting and reflecting device and the light emitting device may be fixedly or movably coupled together in a relatively close physical arrangement/position. For example, in some embodiments, the light refracting and reflecting device may be suspended (e.g., movably suspended, such as via a flexible wire, string or the like) from the light emitting device, and the light emitting device may be configured to emit light that is transmitted downwardly towards the light refracting and reflecting device such that light is incident upon, and ultimately refracted and reflected by, the light refracting and reflecting device. In some embodiments, the system is configured as a lighting fixture, such as but not limited to a ceiling/suspended lighting fixture (e.g., a chandelier or pendant light) or a lamp (e.g., a free standing lamp).

In one aspect, the present disclosure provides light refracting and reflecting devices. Such a device may comprise a base with a translucent portion having an outer surface, and a plurality of refractors and a plurality of reflectors supported by the translucent portion. The refractors are configured to refract incident light within a visible spectrum, and the reflectors are configured to reflect incident light within the visible spectrum. A first refractor of the plurality of refractors is coupled to the outer surface. A first reflector of the plurality of reflectors is coupled to at a refractor, and is not coupled to the outer surface. A second reflector of the plurality of reflectors is coupled to a refractor and another reflector, and is not coupled to the outer surface.

In some embodiments, the first reflector may be coupled to the first refractor. In some such embodiments, the second reflector may be coupled to the first reflector. In some such embodiments, the second reflector may be coupled to the first refractor.

In some embodiments, a second refractor of the plurality of refractors may be coupled to the outer surface, and the first reflector may be coupled to the first refractor and the second refractor. In some such embodiments, the second refractor may be coupled to the first refractor.

In some embodiments, a second refractor of the plurality of refractors is coupled to at least one of a refractor and a reflector, and is not coupled to the outer surface. In some such embodiments, the second refractor is coupled to the first refractor, and the first reflector is coupled to the second refractor.

In some embodiments, refractors of a first plurality of refractors are each coupled to the outer surface. In some such embodiments, reflectors of a first plurality of reflectors are each coupled to a refractor of the first plurality of refractors and not to the outer surface. In some such embodiments, the first plurality of reflectors comprises a plurality of reflectors of a first size and a plurality of reflectors of a second size that differs from the first size. In some such embodiments, the first plurality of refractors comprises a plurality of refractors of a first size and a plurality of refractors of a second size that differs from the first size.

In some embodiments, reflectors of a second plurality of reflectors are each coupled to the outer surface. In some such embodiments, more than one of the reflectors of the second plurality of reflectors are coupled to a refractor of the first plurality of refractors. In some such embodiments, the first plurality of refractors comprises a plurality of refractors of a first size and a plurality of refractors of a second size that differs from the first size, the first plurality of reflectors comprises a plurality of reflectors of a third size and a plurality of reflectors of a fourth size that differs from the third size, and the second plurality of reflectors comprises a plurality of reflectors of a fifth size and a plurality of reflectors of a sixth size that differs from the fifth size.

In some embodiments, the first refractor is in physical contact with the outer surface via a translucent adhesive, the first reflector is in physical contact with a refractor via a translucent adhesive, and the second reflector is in physical contact with a refractor via a translucent adhesive. In some embodiments, each reflector of the plurality of reflectors is coupled to at least one of the outer surface, a refractor and another reflector via a translucent adhesive, and each refractor of the plurality of refractors is coupled to at least one of the outer surface, a reflector and another refractor via a translucent adhesive.

In some embodiments, the plurality of refractors comprises refractors of a first size and refractors of a second size that differs from the first size, and the plurality of reflectors comprises reflectors of a third size and reflectors of a fourth size that differs from the third size.

In some embodiments, the translucent portion comprises glass. In some such embodiments, the translucent portion is formed of crystal glass with a plurality of facets that refracts incident light within the visible spectrum.

In some embodiments, each refractor of the plurality of refractors comprises crystal glass with a plurality of facets. In some such embodiments, each refractor of the plurality of refractors is an octagonal glass crystal.

In some embodiments, each reflector of the plurality of reflectors comprises at least one of glass and acrylic. In some embodiments, each reflector of the plurality of reflectors is opaque. In some such embodiments, the plurality of reflectors comprises a first plurality of reflectors that have a first hue, and a second plurality of reflectors that have a second hue that differs from the first hue. In some embodiments, each reflector of the plurality of reflectors comprises a reflection factor of at least 50% to light within the visible spectrum. In some embodiments, at least 50% of the light reflected by each reflector of the plurality of reflectors is specular reflected light. In some embodiments, each reflector of the plurality of reflectors is spherical.

In some embodiments, the translucent portion is formed of glass, each refractor of the plurality of refractors is formed of crystal glass and comprises a plurality of facets, each reflector of the plurality of reflectors is spherical and opaque, the plurality of refractors comprises a plurality of refractors of a first size and a plurality of refractors of a second size that differs from the first size, the plurality of refractors comprises a plurality of refractors coupled to the outer surface, the plurality of reflectors comprises a plurality of reflectors of a third size and a plurality of reflectors of a fourth size that differs from the third size, and the plurality of reflectors comprises a plurality of reflectors coupled to the outer surface and a plurality of reflectors that are coupled to at least one of a refractor and another reflector and not coupled to the outer surface.

In another aspect, the present disclosure provides light refracting and reflecting systems, which may be configured as lighting systems, for example. A system may comprise a light refracting and reflecting device as described above, and a light emitting device. The system can be configured such that light emitted from the light emitting device is incident on the outer surface of the translucent portion of the device, the plurality of refractors and the plurality of reflectors (and the refractors refract at least a portion of said incident light and the reflectors reflect at least a portion of said incident light). In some embodiments, light emitted from the light emitting device refracts through the plurality of refractors and reflects off the plurality of reflectors.

It should be appreciated that all combinations of the foregoing aspects and additional concepts discussed in greater detail below are contemplated as being part of the inventive subject matter and to achieve the advantages disclosed herein.

These and other objects, features, aspects and advantages of this disclosure will become apparent from the following detailed description of the various aspects of the disclosure taken in conjunction with the accompanying drawings.

BRIEF DESCRIPTION OF THE DRAWINGS

This disclosure may best be understood by reference to the following detailed description of various embodiments and the accompanying drawings, which may be, but are not necessarily, drawn to scale, and in which like reference numerals represent like aspects throughout the drawings, wherein.

DETAILED DESCRIPTION

Figure 1:
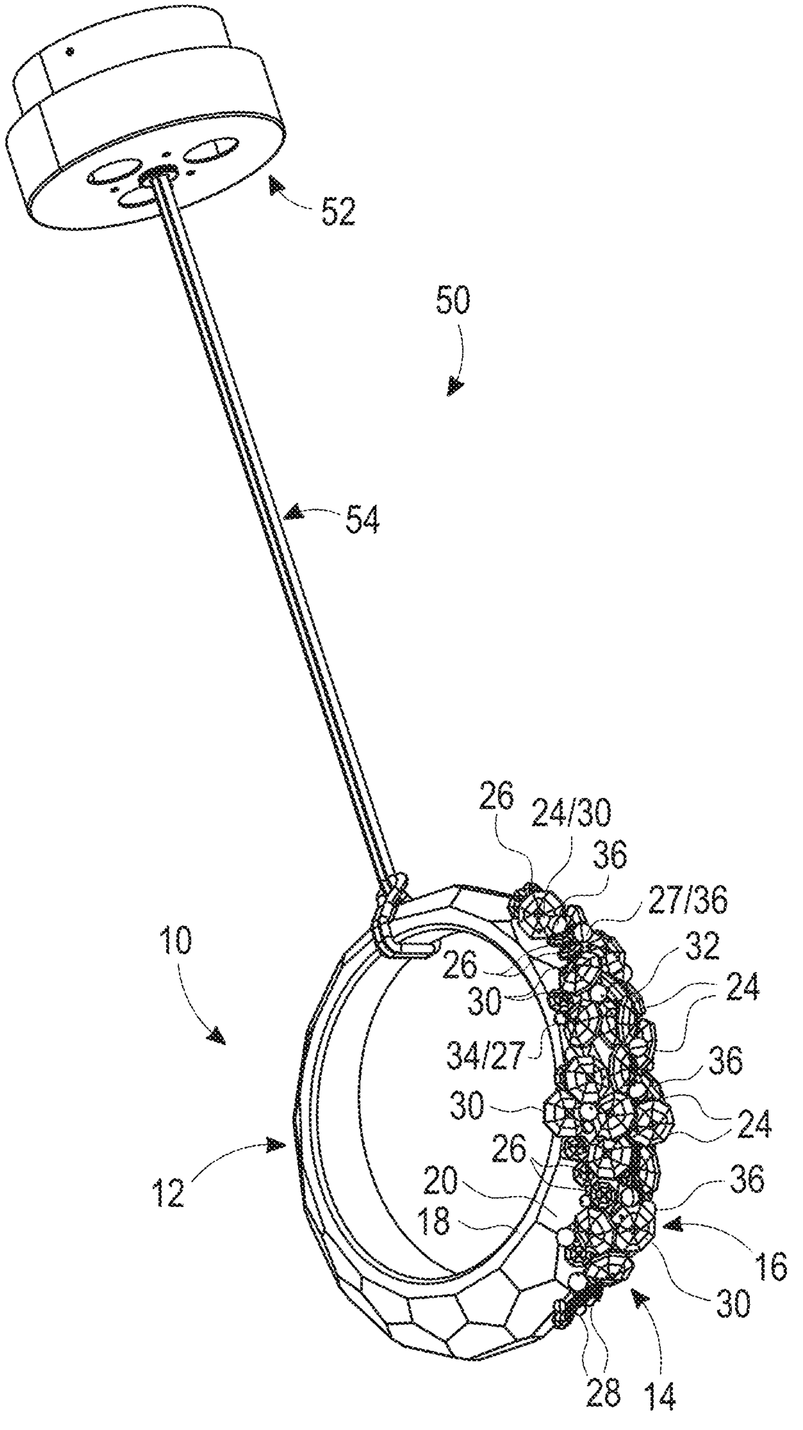
FIG. 1 is a front elevational perspective view of a system having a light reflecting and refracting device and a light emitting device, according to an embodiment of the present disclosure.

Aspects of the present disclosure and certain examples, features, advantages, and details thereof, are explained more fully below with reference to the non-limiting examples illustrated in the accompanying drawings. Descriptions of well-known materials, features, aspects, components, fabrication, processing techniques, etc., may be omitted so as not to unnecessarily obscure the relevant details. It should be understood, however, that the detailed description and the specific examples, while indicating aspects of the disclosure, are given by way of illustration only, and are not by way of limitation. Various substitutions, modifications, additions, and/or arrangements, within the spirit and/or scope of the underlying inventive concepts will be apparent to those skilled in the art from this disclosure.

Terminology used herein is for the purpose of describing particular examples only and is not intended to be limiting. As used herein, the singular forms "a", "an" and "the" are intended to include the plural forms as well, unless the context clearly indicates otherwise. Furthermore, references to "one example" or "one embodiment" are not intended to be interpreted as excluding the existence of additional examples that also incorporate the recited features. Moreover, unless explicitly stated to the contrary, the terms "comprising" (and any form of "comprise," such as "comprises" and "comprising"), "have" (and any form of "have," such as "has" and "having"), "include" (and any form of "include," such as "includes" and "including"), and "contain" (and any form of "contain," such as "contains" and "containing") are used as open-ended linking verbs. As a result, any examples that "comprises," "has," "includes" or "contains" one or more step or element possesses such one or more step or element, but is not limited to possessing only such one or more step or element.

The term "translucent," as used herein, is inclusive of "transparent," where transparency is a high degree of translucency. The term "opaque" as used herein means not substantially translucent.

The phrases "visual spectrum" and "visible light range," when used herein with respect to light, refer to the segment of the electromagnetic spectrum that the human eye can view, and more specifically light with a wavelength within the range of 380 to 700 nanometers. For purposes of this disclosure, the translucency and the opacity of an object or material with respect to light within the visible spectrum/light range is with respect to the total intensities of incident light with wavelengths within the range of 380 to 700 nanometers (as opposed to with respect to a particular wavelength or wavelengths within the incident light).

The term "coupled" and its grammatical equivalents is used herein to refer to two or more objects, portions or materials being joined, fastened or connected together such that they are: (1) in abutment/engagement or fused together; and/or (2) binded and/or bonded together by an intermediate adhesive or other material that is in direct abutment/engagement therewith and extends directly therebetween.

The present disclosure is directed to light refracting and reflecting devices that refract and reflect light, respectively, within the visible spectrum. As shown in FIGS. 1-18, in one embodiment, a light refracting and reflecting device 10 according to the present disclosure includes a plurality of separate and distinct light refracting members 14 and a plurality of separate and distinct light reflecting members 16 assembled on a base 12. The base 12 may include a translucent portion 18, and the refractors 14 and the reflectors 16 may be supported by the translucent portion 18. For example, the refractors 14 and the reflectors 16 may be provided on an outer surface 20 of the translucent portion 18. In the exemplary illustrated embodiment, the device 10 includes the refractors 14 and the reflectors 16 provided on one side portion of the translucent portion 18 (which is convex) in close proximity to each other. In some embodiments, the base 12 may include a plurality of separate and distinct and/or spaced translucent portions 18 that include the refractors 14 and the reflectors 16 thereon.

The refractors 14 and reflectors 16 form a light refracting and reflecting array, covering or "overgrowth" extending over and secured to the translucent portion 18 such that they are physically supported by the translucent portion 18/base 12. The refractors 14 and reflectors 16, and potentially the translucent portion 18, transmit/pass light therebetween (via transmission and/or reflection) a number of times, and reflect and/or refract and/or scatter the light. The refractors 14 and reflectors 16 (and potentially the translucent portion 18) "bounce" incident light between them, and modify the light in various ways (e.g., in direction, speed, intensity, quality, spectrum, wavelength concentration/separation, etc.) to create a unique and visually appealing lighting scheme.

Figure 2:
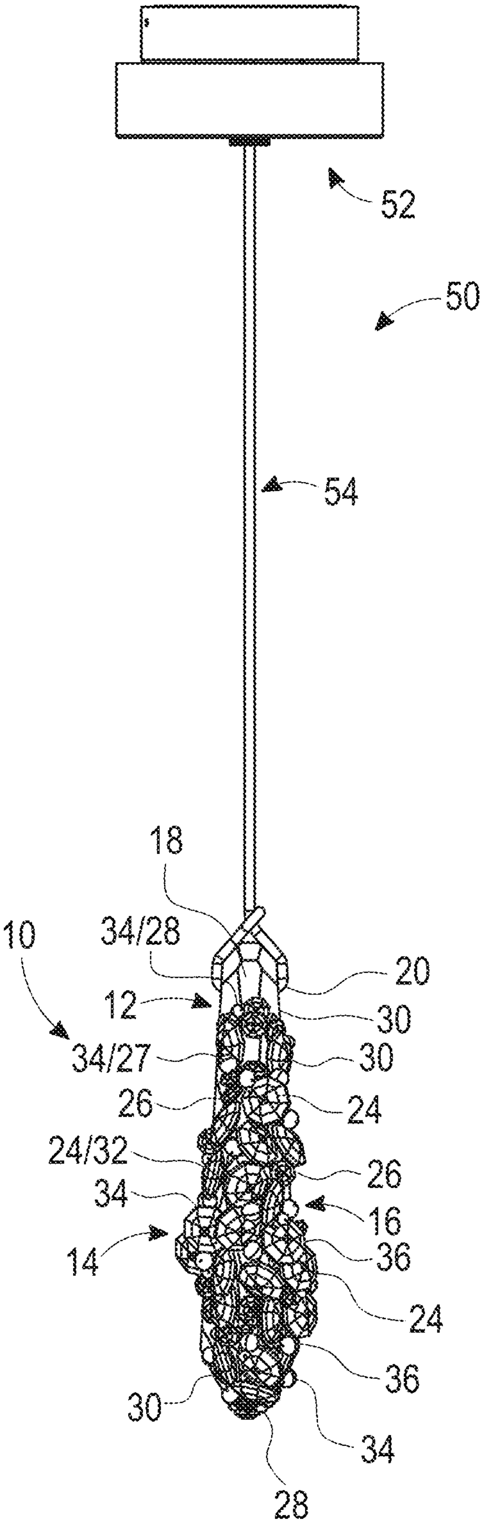
FIG. 2 is a right side view of the system of FIG. 1, according to an embodiment of the present disclosure.

As shown in FIGS. 1 and 2, the light refracting and reflecting device 10 may be incorporated into a system 50 with a light emitting device 52. However, it is specifically contemplated herein that the device 10 may not be used or incorporated in a system with a particular light emitting device 52. Rather, the device 10 may equally be employed without the light emitting device 52, or any other particular light emitting device. For example, the light refracting and reflecting device 10 may interact with ambient light in a particular location. The ambient light may be sunlight and/or light emanating from one or more light emitting devices that are not specially associated or provided with the light refracting and reflecting device 10. It is thereby not necessary for the light refracting and reflecting device 10 to be included in a system with a particular light emitting device.

The light emitting device 52 is configured to emit light, such as light within the visible spectrum (e.g., substantially white light). For example, the light emitting device 52 may include at least one light emitting diode (LED), incandescent bulb, or the like. As also shown in FIGS. 1 and 2, the system 50 may further include a support, connector or frame 54 that physically couples the light emitting device 52 and the light refracting and reflecting device 10. The exemplary support 54 illustrated in FIGS. 1 and 2 is a wire, rope, filament, tube, chain or the like such that the light refracting and reflecting device 10 is suspended from the light emitting device 52 via the support 54. The support 54 may or may not allow for movement of the light refracting and reflecting device 10 relative to the light emitting device 52.

The exemplary light emitting device 52, as shown in FIGS. 1 and 2, is configured as an overhead (e.g., ceiling) or elevated mounted fixture that emits at least some light in a downward direction. The support 54 extends downwardly from the light emitting device 52 to the light refracting and reflecting device 10 such that light transmitted/emanating from the least one light emitting device 52 is incident on the translucent portion 18, the refractors 14 and/or the reflectors 16 of the device 10. The system 50 may thereby comprise a ceiling/suspended lighting fixture (e.g., a chandelier or pendant light). It is noted that the light emitting device 52 and the support 54 may take on other configurations and/or otherwise be arranged with the light refracting and reflecting device 10 such that light is incident on the translucent portion 18, the refractors 14 and/or the reflectors 16.

As shown in FIGS. 1 and 6-16, the base 12 may be of one-piece construction, and may be monolithic. In alternative embodiments, the base 12 may be comprised of multiple pieces or members attached together, and/or may be formed from two or more different materials. As also shown in FIGS. 1 and 6-16, the exemplary illustrated base 12 base 12 is configured in an annular shape with a through-hole. However, the base 12 may comprise others shapes and configurations, as illustrated in FIGS. 19-43 and discussed below.

As discussed above, the base 12 may comprise a translucent portion 18 (e.g., transparent portion). The exemplary base 12, as illustrated in FIGS. 1 and 5-10, is fully translucent in that the entirety of the base 12 (e.g., an annular member) is the translucent portion 18. The translucent portion 18 may be configured to refract incident light within the visible spectrum. In some embodiments, the translucent portion 18 may be faceted. For example, the external surface 20 of the translucent portion 18 may include or be defined by a plurality of substantially flat or smooth external surface portions that are oriented differently from adjacent surface portions. In some embodiments, the translucent portion 18 may comprise a refractive index of at least 1.4, or at least 1.45, or at least 1.5 (with respect to light within the visible spectrum). The translucent portion 18 may be singular refractive, or may be at least partially double refractive (comprise birefringence) with respect to light within the visible spectrum. In some embodiments, the translucent portion 18 may be prismatic with respect to light within the visible spectrum. In some embodiments, the translucent portion 18 allows at least 10%, or at least 25%, or at least 40%, or at least 50%, or at least 75%, or at least 95% of incident light within the visible spectrum to pass therethrough.

In some embodiments, the translucent portion 18 (which may be a portion of the base 12 or the entirety of the base 12) may be formed of glass. In some such embodiments, the translucent portion 18 may be formed of crystal glass, such as faceted crystal glass. However, it is noted that the translucent portion 18 may be formed, at least partially, of other translucent materials.

With reference to FIGS. 1-4 and 6-18, the light refracting and reflecting device 10 includes a plurality of separate and distinct light refracting members 14 provided on the outer surface 20 of the base 12, such as the outer surface 20 of the translucent portion 18. The refractors 14 and reflectors 16 are provided in an array on one side portion of the base 12/translucent portion 18 over outer-facing portions of the outer surface 20 thereof.

The light refracting members 14 are configured to refract at least a portion of incident light within the visible spectrum. A refractor 14 may refract light that is transmitted/emanating from the translucent portion 18, at least one reflector 16 and/or at least one other refractor 14. A refractor 14 also may refract light such that the refracted light is transmitted to the translucent portion 18, at least one reflector 16 and/or at least one other refractor 14. The refractors 14 may be oriented differently from each other. As shown in FIGS. 1, 2 and 6-18, in some embodiments, the device 10 may include more refractors 14 than reflectors 16.

The refractors 14 are translucent, and potentially transparent, to light within the visible spectrum. In some embodiments, the refractors 14 allow at least 10%, or at least 25%, or at least 40%, or at least 50%, or at least 75%, or at least 95% of incident light within the visible spectrum to pass through a portion thereof. In some embodiments, the refractors 14 are faceted. For example, the external surfaces/sides of the refractors 14 may include or be defined by a plurality of substantially flat or smooth external surface portions that are oriented differently from adjacent surface portions. In some embodiments, the refractors 14 may comprise a refractive index of at least 1.4, or at least 1.45, or at least 1.5 (with respect to light within the visible spectrum). The refractors 14 may be single refractive, or may be at least partially double refractive (comprise birefringence) (with respect to light within the visible spectrum). In some embodiments, the refractors 14 may be prismatic with respect to light within the visible spectrum.

Figure 3:
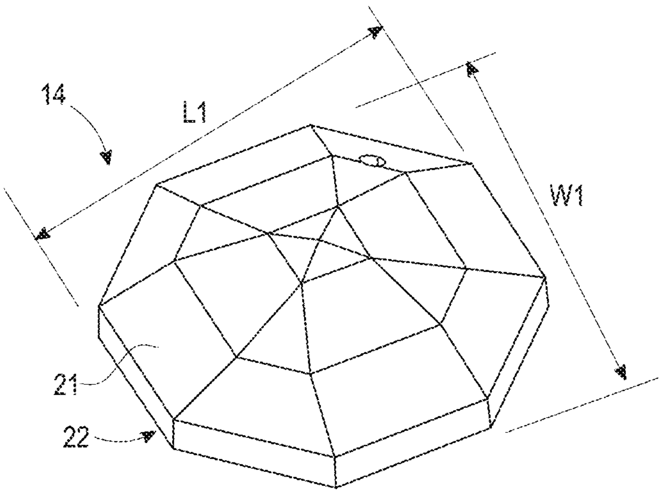
FIG. 3 is an elevational top perspective view of a refractor of the system of FIG. 1, according to an embodiment of the present disclosure.
Figure 4:
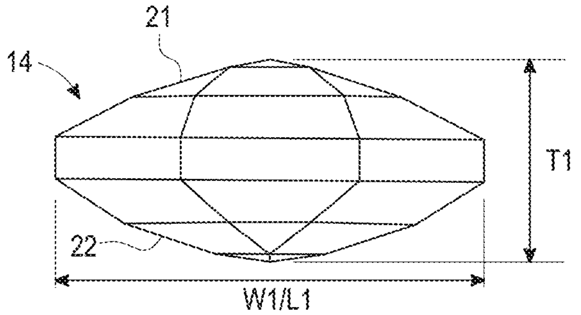
FIG. 4 is a side view of the refractor of FIG. 3, according to an embodiment of the present disclosure.
Figure 5:
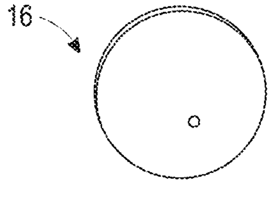
FIG. 5 is an elevational top perspective view of a reflector of the system of FIG. 1, according to an embodiment of the present disclosure.
Figure 6:
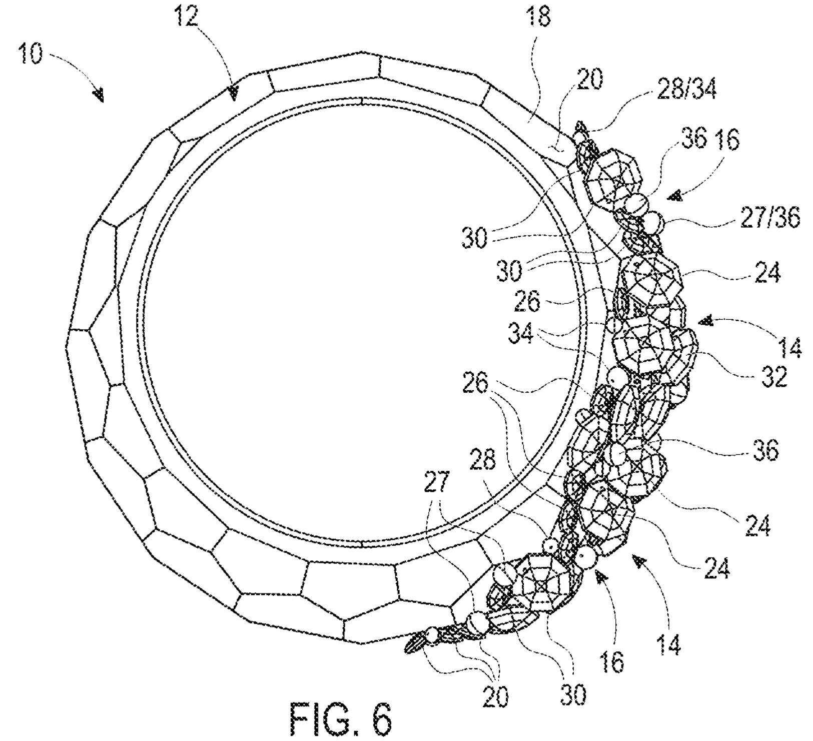
FIG. 6 is a front view of the light reflecting and refracting device of FIG. 5, according to an embodiment of the present disclosure.
Figure 7:
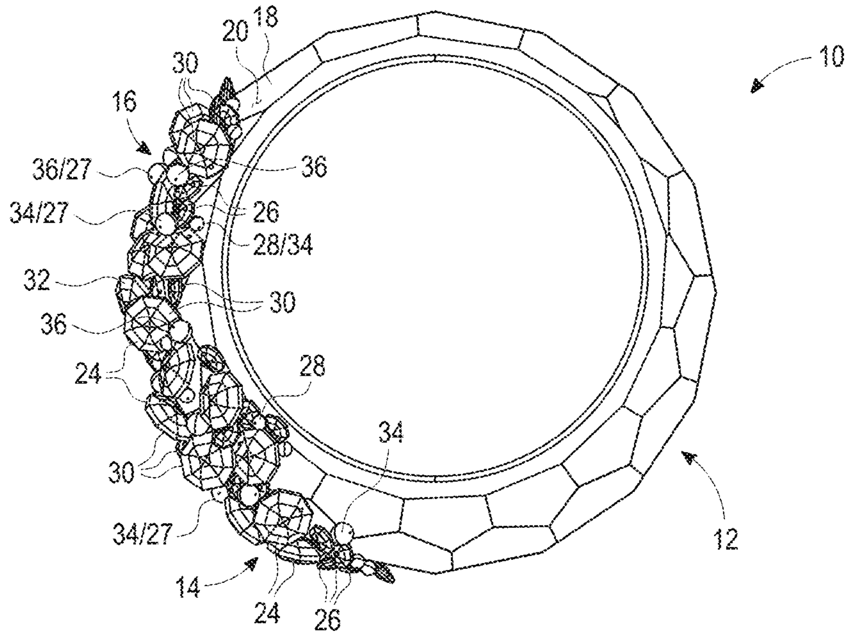
FIG. 7 is a rear view of the light reflecting and refracting device of FIG. 5, according to an embodiment of the present disclosure.
Figure 8:
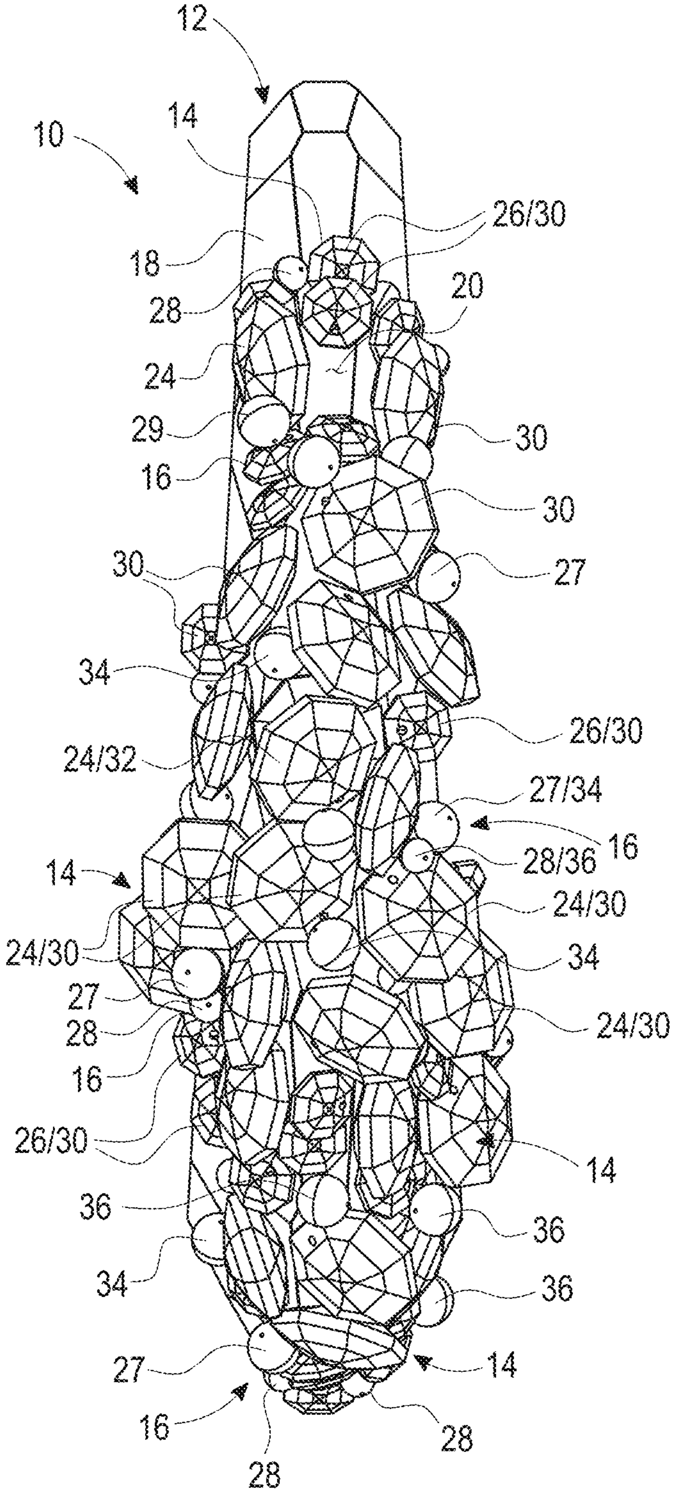
FIG. 8 is a right side view of the light reflecting and refracting device of FIG. 5, according to an embodiment of the present disclosure.
Figure 9:
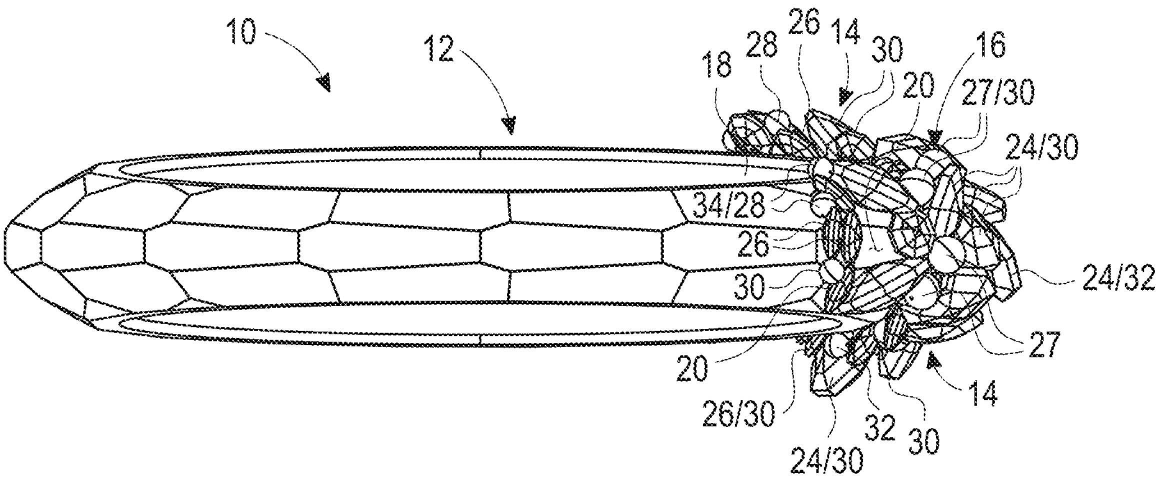
FIG. 9 is a top view of the light reflecting and refracting device of FIG. 5, according to an embodiment of the present disclosure.
Figure 10:
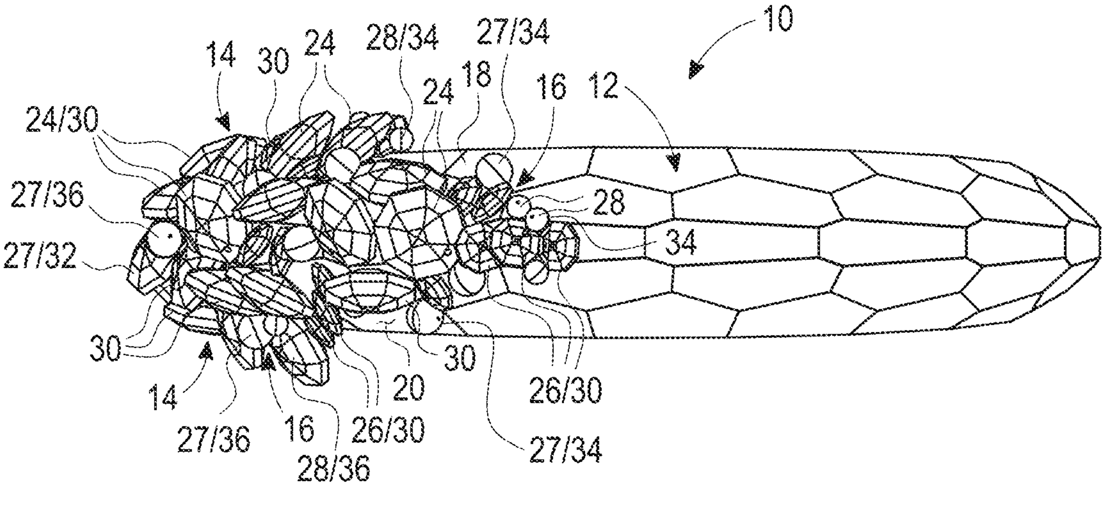
FIG. 10 is a bottom view of the light reflecting and refracting device of FIG. 5, according to an embodiment of the present disclosure.
Figure 11:
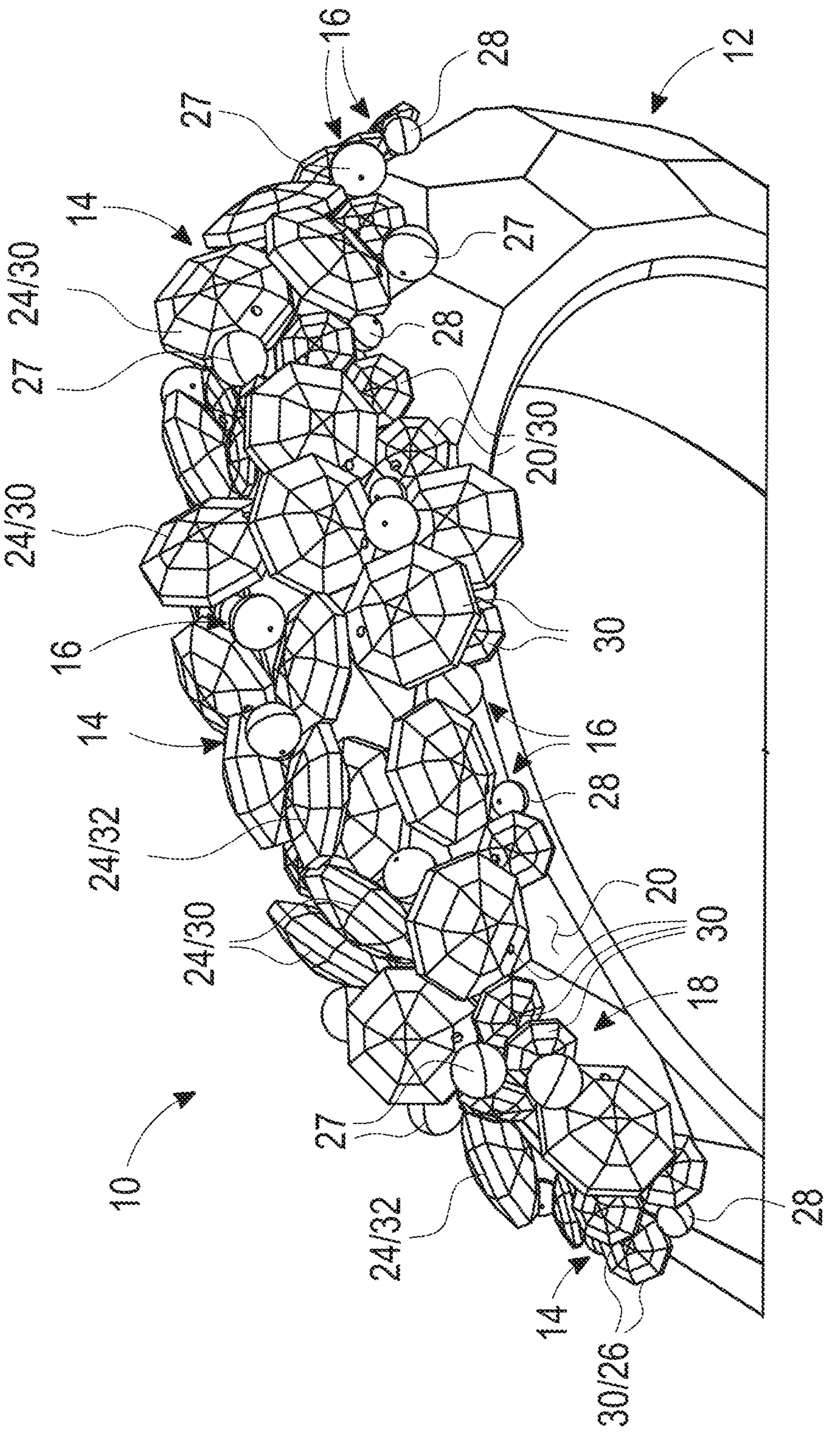
FIG. 11 is an elevational perspective view of a portion of the light reflecting and refracting device of FIG. 5, according to an embodiment of the present disclosure.
Figure 12:
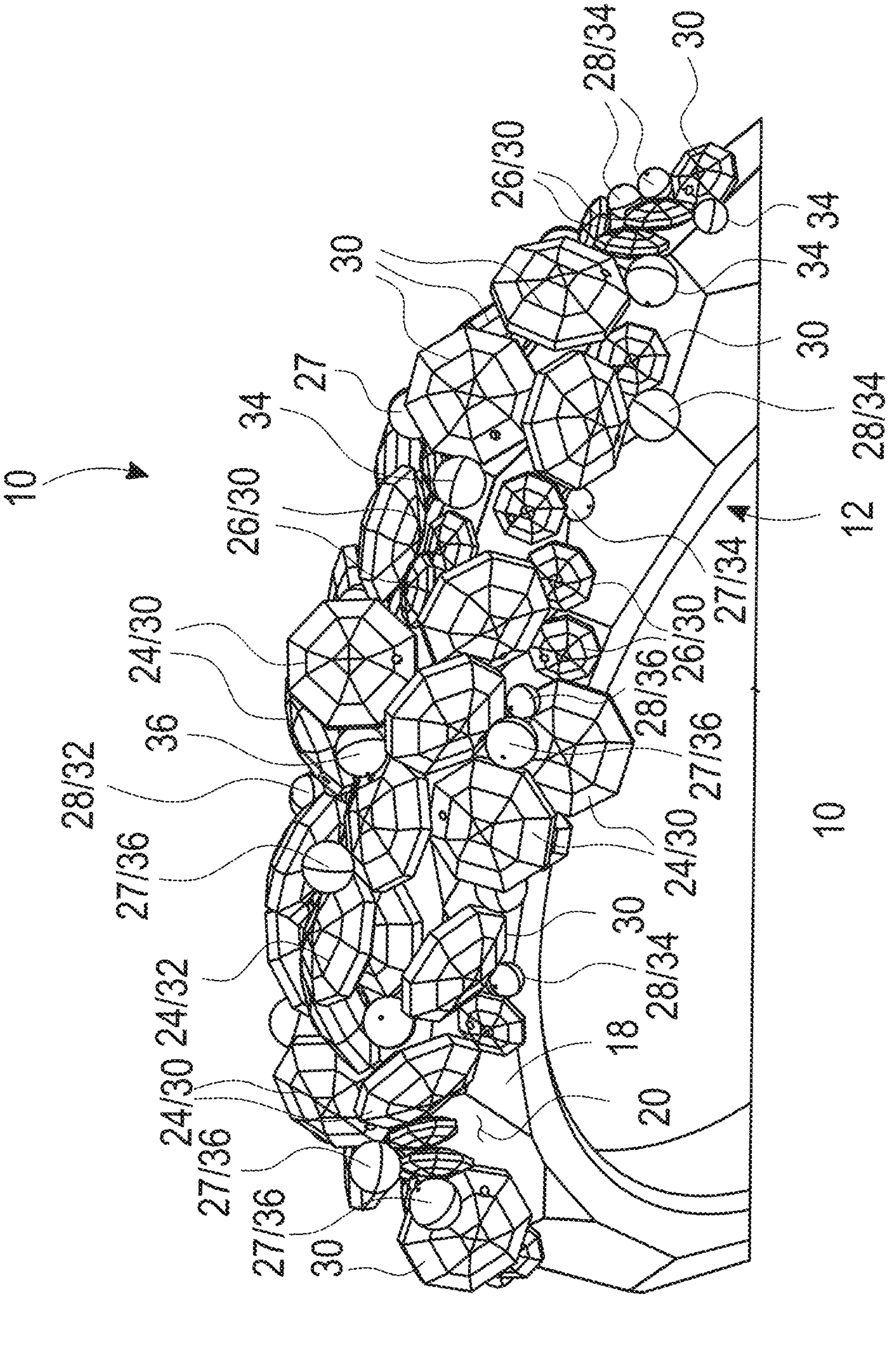
FIG. 12 is an elevational perspective view of a portion of the light reflecting and refracting device of FIG. 5, according to an embodiment of the present disclosure.
Figure 13:
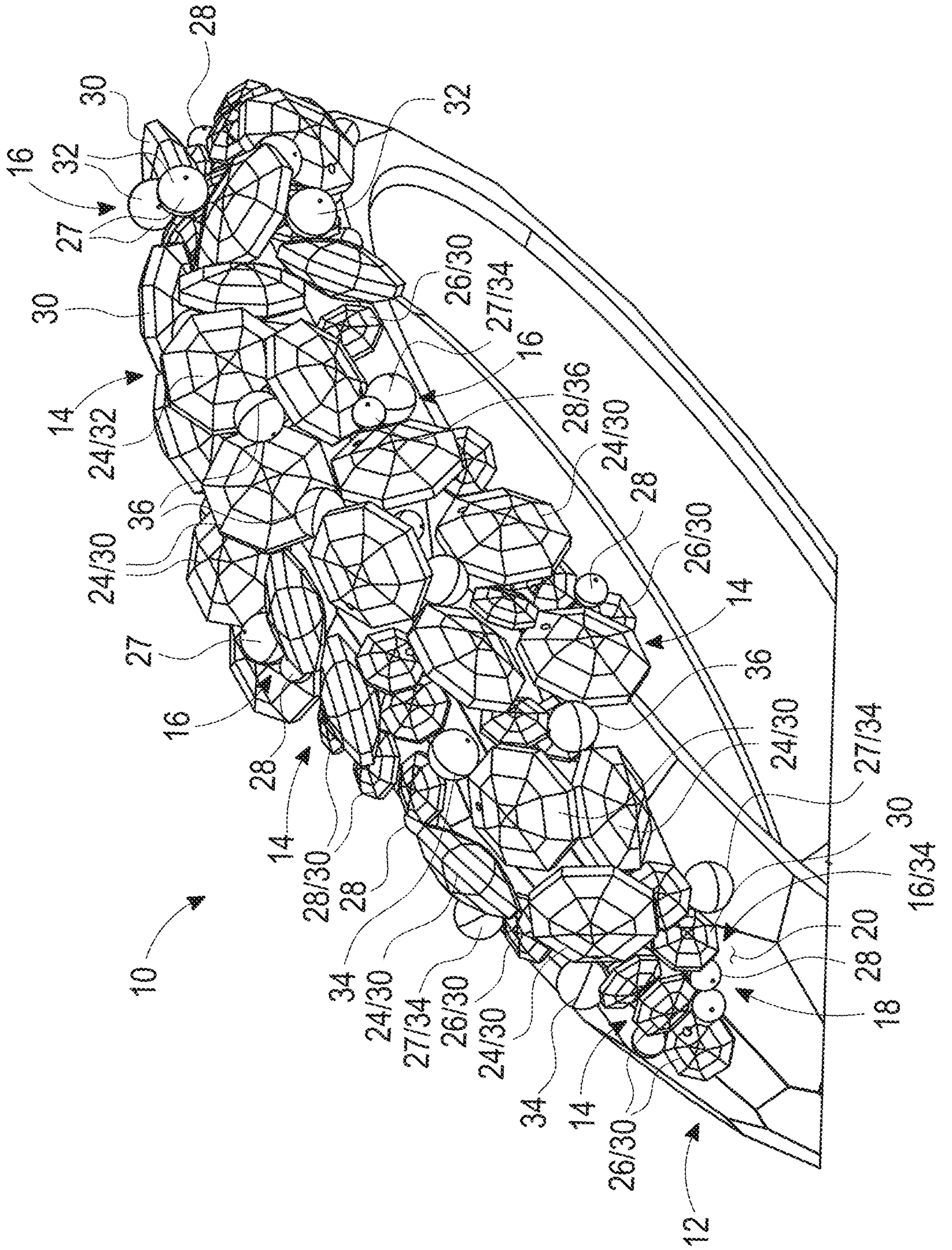
FIG. 13 is an elevational perspective view of a portion of the light reflecting and refracting device of FIG. 5, according to an embodiment of the present disclosure.
Figure 14:
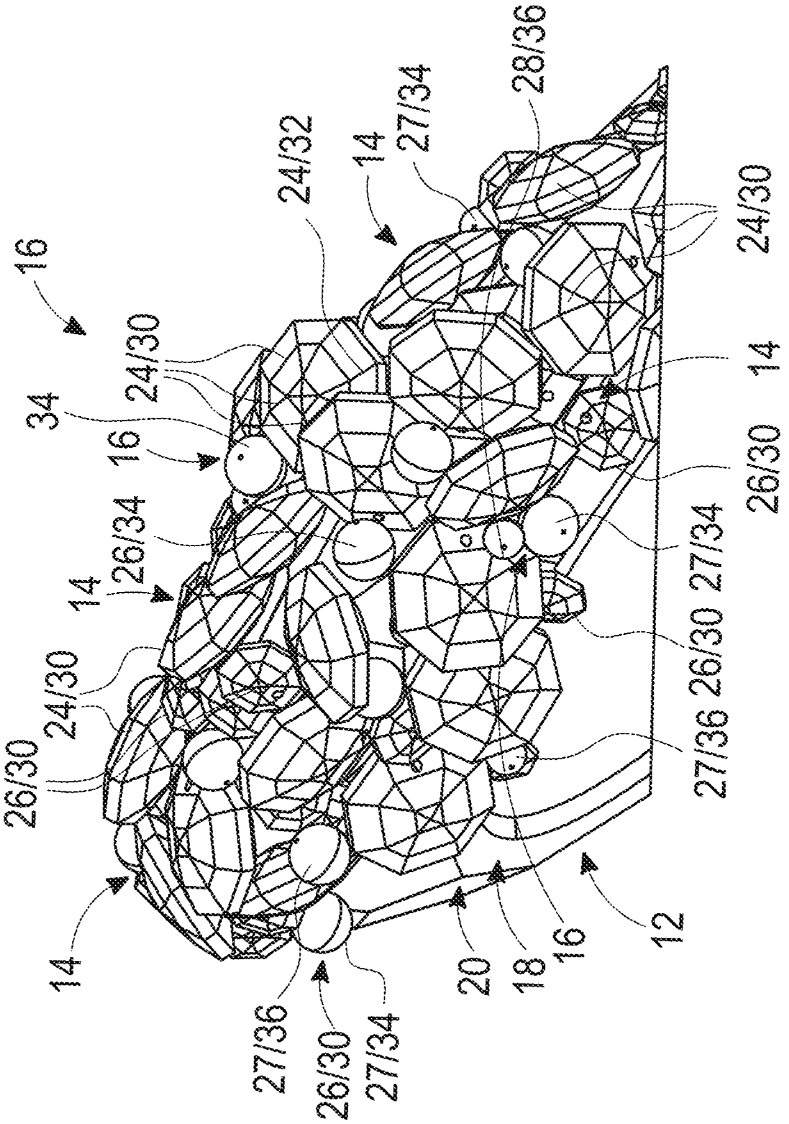
FIG. 14 is an elevational perspective view of a portion of the light reflecting and refracting device of FIG. 5, according to an embodiment of the present disclosure.
Figure 15:
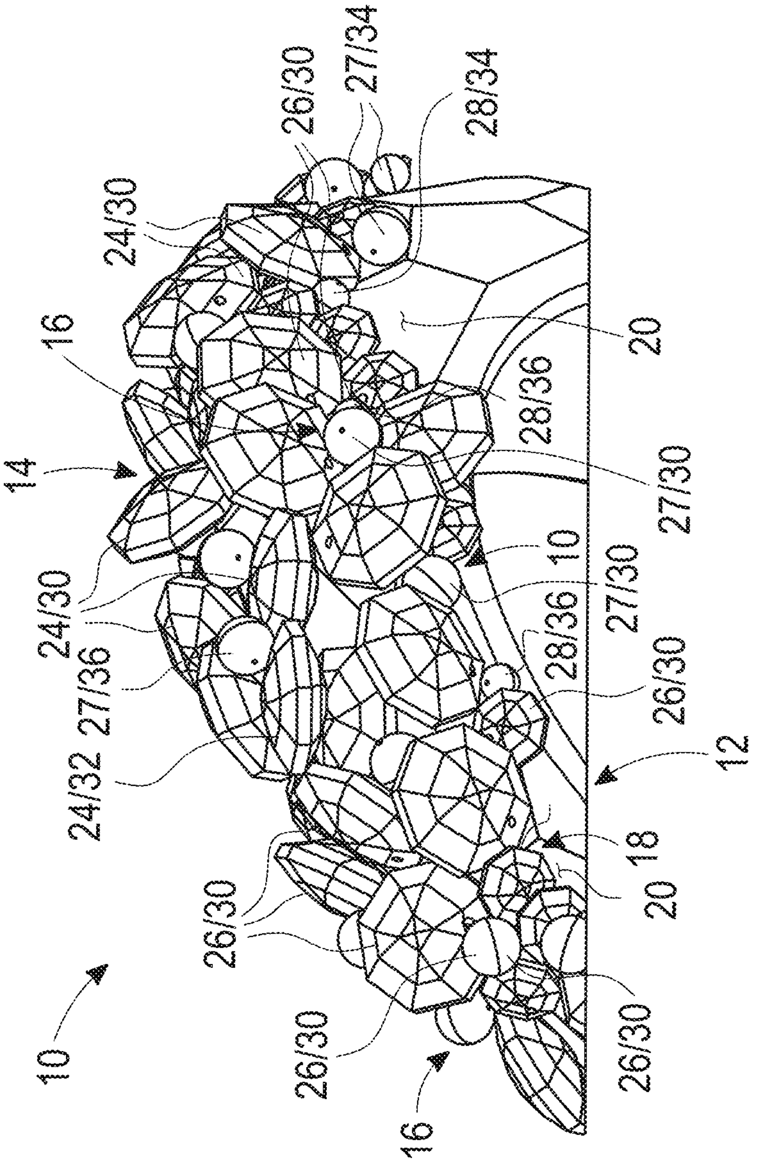
FIG. 15 is an elevational perspective view of a portion of the light reflecting and refracting device of FIG. 5, according to an embodiment of the present disclosure.
Figure 16:
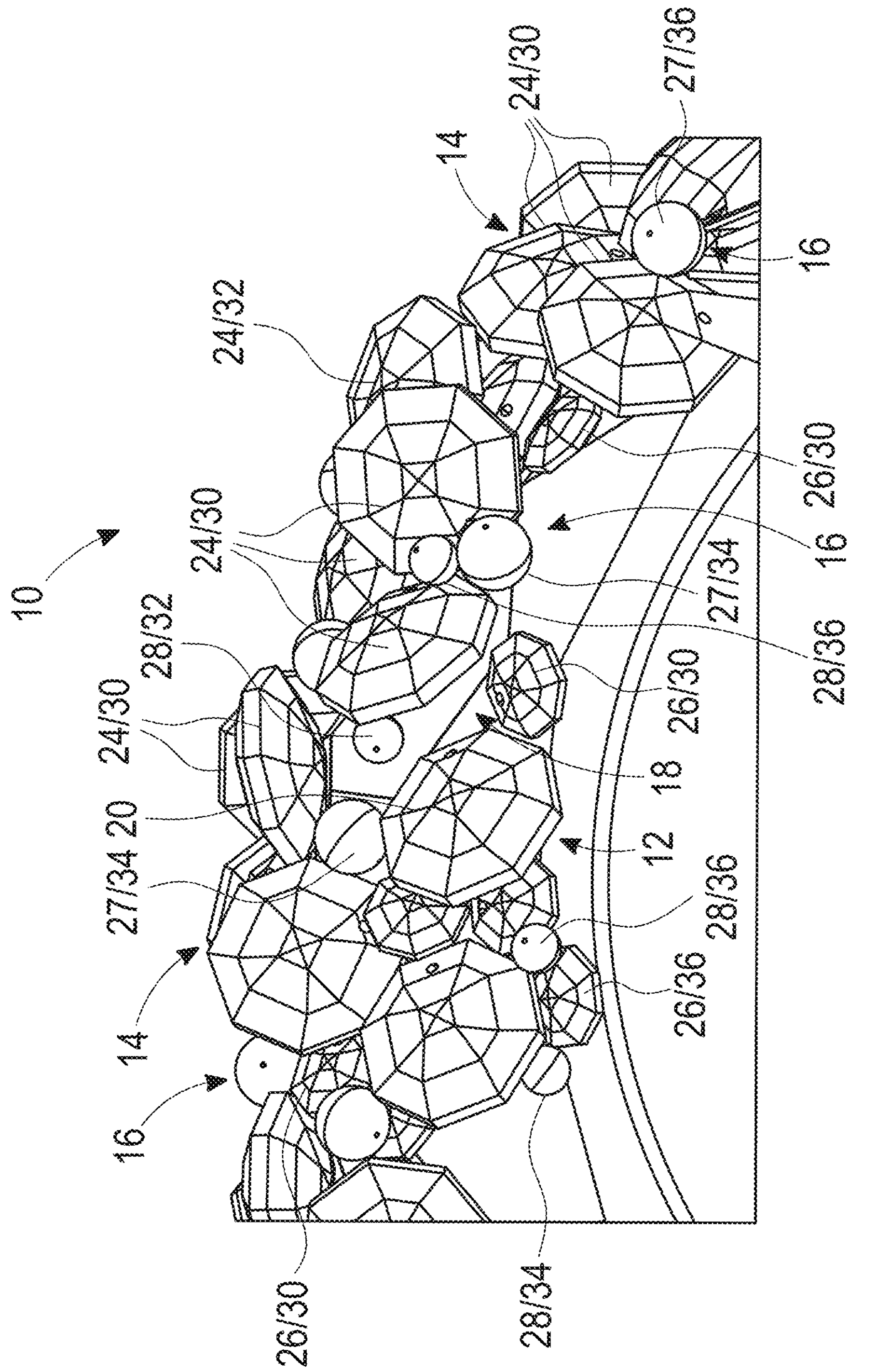
FIG. 16 is an elevational perspective view of a portion of the light reflecting and refracting device of FIG. 5, according to an embodiment of the present disclosure.
Figure 17:
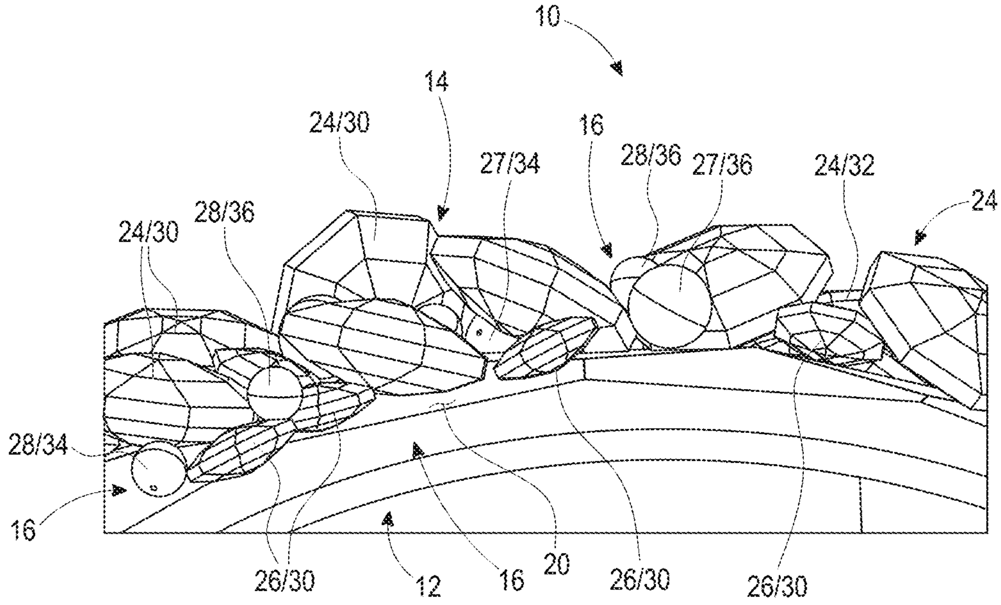
FIG. 17 is an elevational perspective view of a portion of the light reflecting and refracting device of FIG. 5, according to an embodiment of the present disclosure.
Figure 18:
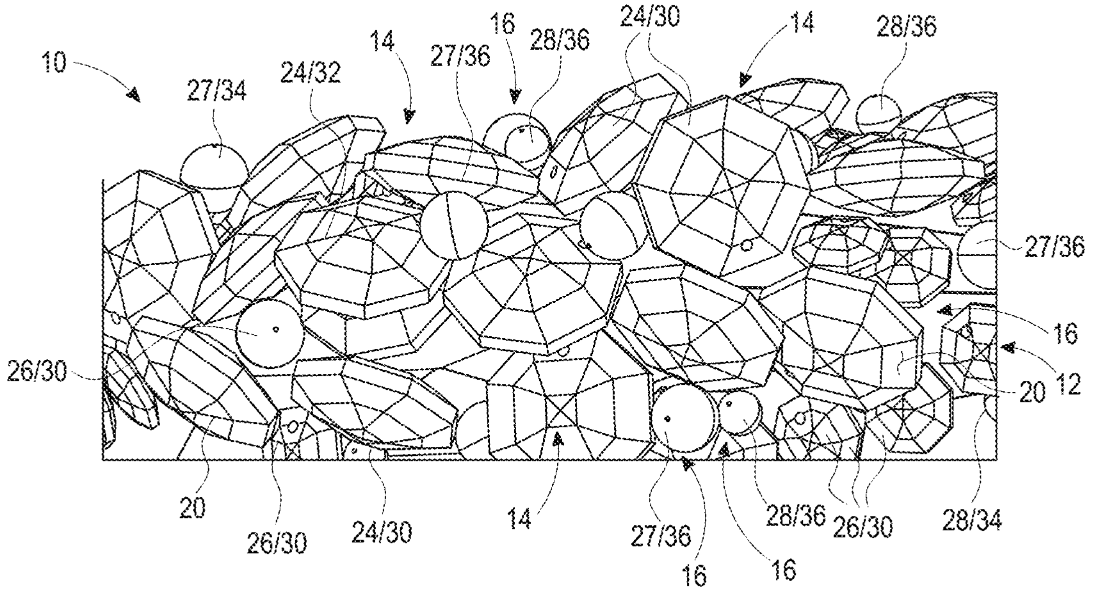
FIG. 18 is an elevational perspective view of a portion of the light reflecting and refracting device of FIG. 5, according to an embodiment of the present disclosure.

The refractors 14 can be formed of glass, such as glass crystal. However, it is noted that the refractors 14 may be formed, at least partially, of other translucent refractive materials. As noted above, the refractors 14 may be glass crystals. For example, as shown in FIGS. 3 and 4, in some embodiments, the refractors 14 may be thin faceted crystals that define a total/maximum thickness T1 that is less than a total/maximum width W1 and a total/maximum length L1 thereof. The refractors 14 may thereby be relatively thin. The total/maximum thickness T1 of the refractors 14 may be formed between portions (e.g., center portions) or surfaces of a top side 21 and a bottom or rear side 22 thereof. In some embodiments, the top and/or bottom sides 21, 22 of the refractors 14 may be faceted, and thereby defined by a plurality of substantially flat or smooth surfaces. The reflectors 14 may also include a plurality of lateral side surfaces between the top and bottom 21, 22 sides that define the length and width of the refractors 14, which may also comprise or be formed one or more faceted surface. As explained further below, the bottom side 22 of the refractors 14 may be coupled to the outer surface 20 and/or at least one other refractor 14 and/or at least one reflector 16. As shown in FIGS. 1-4 and 6-18, in the illustrated exemplary embodiment, the refractors 14 are octagonal shaped when viewed at least from the top or bottom sides 21, 22 (e.g., relatively thin octagonal glass crystals). It is noted that the refractors 14 may form one or more different shapes.

As shown in FIGS. 6-18, the plurality of refractors 14 of the device 10 may include at least one first refractor 24 of a first size, and at least one second refractor 26 of a second size that differs from the first size. In some embodiments, the first refractor 24 may be larger than the second refractor 26. For example, at least one dimension of the first refractor 24 may be greater than the corresponding dimension of the second refractor 26. In one exemplary embodiment, each dimension of the first refractor 24 may be larger than the corresponding dimension of the second refractor 26. In some embodiments, the first and second refractors 24, 26 may be of the same shape, as shown in FIGS. 6-18. The illustrated exemplary device 10 includes a plurality of the first reflectors 24 supported by/on the translucent portion 18, and a plurality of the second reflectors 26 supported by/on the translucent portion 18, with the first reflectors 24 being larger octagonal glass crystals than the second reflectors 26. In some embodiments, the bottom side 22 of the refractors 14 may face toward the outer surface 20. As also shown in FIGS. 6-18, in some embodiments, the device 10 may include more first refractors 24 than second refractors 26, with the first refractors 24 being larger than the second refractors 26.

As shown in FIGS. 11-18, the plurality of refractors 14 include a third plurality of refractors 30 that are coupled to respective portions of the outer surface 20 of the translucent portion 18. In some such embodiments, at least some of the third refractor 30 may be coupled to the outer surface 20 and at least one other refractor 14 (such as at least one other third refractor 30) and/or at least one reflector 16. In some such embodiments, some of the third refractors 30 may each be coupled to a plurality of other third refractors 30. At least some of the third refractors 30 may overlap, at least partially, at least one other third refractor 30, as shown in FIGS. 11-18. For example, the bottom side 22 of a third refractor 30 may extend over a portion of the top side 21 of another adjacent third refractor 30. However, as also shown in FIGS. 11-18, a third refractor 30 may not overlap at least one other third refractor 30. In some embodiments, the majority of the refractors 14 may be the third refractors 30 that are coupled to respective portions of the outer surface 20 of the translucent portion 18. The third refractors 30 may include at least one first refractor 24 of the first size and/or at least one second refractor 26 of the second size, as shown FIGS. 1-18.

As explained further below, at least one reflector 16 may be coupled to one or more third refractor 30. For example, a reflector 16 may be coupled to the top side 21, the bottom side 22 and/or a lateral side of a third refractor 30. In this way, a third refractor 30 may be coupled to the outer surface 20, at least one reflector 16 and/or another third refractor 30. For example, a third refractor 30 may be coupled to the outer surface 20 and coupled to at least one reflector 16 that is also coupled to the outer surface 20. As another example, a third refractor 30 may be coupled to the outer surface 20 and another third refractor 30, and coupled to at least one reflector 16 that is not coupled to the outer surface 20.

As also shown in FIGS. 11-18, the plurality of refractors 14 may also include at least one fourth refractor 32 (e.g., one or a plurality of fourth refractors) that is not coupled to the outer surface 20 of the translucent portion 18. A fourth refractor 32 of the plurality of refractors 14 may be coupled to at least one of the third refractors 30 (e.g., one third refractor or a plurality of third refractors 30) and/or to at least one reflector 16 (e.g., one reflector 14 or a plurality of reflectors 14) that is coupled to the outer surface 20, but itself not coupled to the outer surface 20. In some embodiments, a minority of the plurality of refractors 14 may be fourth refractors 32 that are not coupled to the outer surface 20. In the exemplary illustrated embodiment shown in FIGS. 1, 2 and 6-18, only one of the plurality of refractors 14 is a fourth refractor 32 that is not coupled to the outer surface 20. As shown, the bottom side 22 of the fourth refractor 32 is coupled to a top side 21 of a third refractor 30, and a reflector 16 is coupled to the top side 21 of the fourth refractor 32. It is noted that the fourth refractor 32 may physically contact at least one other third refractor 30 and/or be coupled to at least one third refractor 30. The at least one fourth refractor 32 may include at least one of the first refractors 24 of the first size and/or at least one of the second refractors 26 of the second size, as shown FIGS. 1-18.

The third refractors 30 may be coupled to the outer surface 20 (and potentially to at least one other refractor 14 and/or at least one reflector 16) via an adhesive, glue or other binding or bonding agent or material. For example, in some embodiments, the third refractors 30 may be coupled to the outer surface 20 (and potentially to at least one other refractor 14 and/or at least one reflector 16) via a translucent adhesive (e.g., a transparent adhesive). Similarly, the at least one fourth refractor 32 may be coupled to at least one other reflector 14 and/or at least one reflector 16 via an adhesive, glue or other binding or bonding agent or material. For example, in some embodiments, the at least one fourth refractor 32 may be coupled to at least one other refractor 14 and/or at least one reflector 16 via a translucent adhesive (e.g., a transparent adhesive). In some exemplary embodiments, the transparent adhesive may be a translucent epoxy, a translucent acrylic adhesive, translucent cyanoacrylate adhesive (e.g., an ethyl-based cyanoacrylate adhesive) or modified silicone (MS) polymer adhesive. In some embodiments, the adhesive may be a UV curable adhesive or epoxy. In some embodiments, the translucent adhesive allows at least 10%, or at least 25%, or at least 40%, or at least 50%, or at least 75%, or at least 95% of incident light within the visible spectrum to pass therethrough. In some embodiments, the third refractors 30 may be in physical contact with the outer surface 20 (and potentially in physical contact with at least one other refractor 14 and/or at least one reflector 16), and/or the at least one fourth reflector 32 may be in physical contact with at least one other refractor 14 (such as at least one third refractor 30) and/or at least one reflector 16, such as via a translucent adhesive. In some embodiments, a third refractor 30 may be fused to the outer surface 20 (and potentially to at least one other refractor 14 and/or at least one reflector 16), and/or the at least one fourth reflector 32 may be fused to at least one other refractor 14 and/or at least one reflector 16.

With continued reference to FIGS. 1-3 and 6-18, the light refracting and reflecting device 10 includes a plurality of separate and distinct light reflecting members 16 provided on the outer surface 20 of the base 12, such as the outer surface 20 of the translucent portion 18. The light reflecting members 16 are configured to reflect at least a portion of incident light within the visible spectrum. A reflector 16 may reflect light that is transmitted/emanating from the translucent portion 18, at least one refractor 14 and/or at least one other reflector 16. A reflector 16 may also reflect light such that the reflected light is transmitted to the translucent portion 18, at least one refractor 14 and/or at least one other reflector 16. As shown in FIGS. 1, 2 and 6-18, in some embodiments, the device 10 may include fewer reflectors 16 than refractors 14, and/or the reflectors 16 may be of a smaller size than at least some of the refractors 14 (e.g., smaller than the first refractors 24 and/or the second refractors 26).

The reflectors 16 may be opaque. In some such embodiments, the plurality of reflectors 16 may include reflectors 16 of differing hues (or colors). For example, the device 10 may include a plurality of reflectors 16 that have a first hue, and a plurality of reflectors 16 that have a second hue that differs from the first hue. In some such embodiments, the device 10 may include at least one additional reflector 16 of one or more additional hues (or colors). In some exemplary embodiments, the reflectors 16 may comprise a gold, brass, chrome, nickel, black, silver, white or opalescent hue.

As noted above, the reflectors 16 are configured to reflect light within the visible spectrum. In some embodiments, the reflectors 16 may be configured to reflect a substantial portion of incident light. For example, in some embodiments, each of the plurality of reflectors 16 may include a reflection factor of at least 40%, or at least 50%, or at least 60%, or at least 70%, or at least 80%, or at least 90% of incident light within the visible spectrum. In some embodiments, the reflectors 16 may be configured such that at least a portion (e.g., a substantial portion) of the reflected light is spectrally reflected. For example, at least 10%, or at least 20%, or at least 30%, or at least 40%, or at least 50%, or at least 60%, or at least 70%, or at least 80%, or at least 90% of the light reflected by the reflectors 16 is specular reflected light. In some embodiments, each of the plurality of reflectors comprises a gloss of at least 15 GU, or at least 20 GU, or at least 25 GU, or at least 35 GU, or at least 45 GU, or at least 55 GU, or at least 65 GU, or at least 75 GU or at least 85 GU at 60° to light within the visible spectrum.

As shown in FIGS. 1-3 and 5-18, in some embodiments, each of the plurality of reflectors 16 is spherical. In other embodiments, the reflectors 16 are shaped other than spherically. The reflectors 16 may be configured to reflect incident light in differing directions. For example, the reflective portions of the reflectors 16 may be convex and/or concave (e.g., arcuately and/or rectilinearly) such that light incident on one portion of a reflector 16 is reflected in a first direction and light incident on another portion of the reflector 16 is reflected in a second direction that differs from the first direction.

In some embodiments, the reflectors 16 may be comprised of at least one of glass, acrylic and metal. In some embodiments, the reflectors 16 may have a reflective coating that covers (at least partially) an underlying material that is less reflective to incident light within the visible spectrum. For example, in some embodiments, the reflectors 16 may comprise a glass or acrylic base, and a metallic or other reflective coating that covers the glass or acrylic base.

As shown in FIGS. 6-18, the plurality of reflectors 16 of the device 10 may include at least one first reflector 27 of a first size, and at least one second reflector 28 of a second size that differs from the first size. In some embodiments, the first reflectors 27 may be larger than the second reflectors 28. For example, at least one dimension of the first reflectors 27 may be greater than the corresponding dimension of the second reflectors 28. In one exemplary embodiment, each dimension of the first reflectors 27 may be larger than the corresponding dimension of the second reflectors 28. In some embodiments, the first and second reflectors 27, 28 may be of the same shape, as shown in FIGS. 6-18. The illustrated exemplary device 10 includes a plurality of the first reflectors 27 provided on the translucent portion 18, and a plurality of the second reflectors 28 provided on the translucent portion 18, with the first reflectors 27 being larger spherical reflectors than the second reflectors 28. As also shown in FIGS. 6-18, in some embodiments, the device 10 may include the same number of first and second reflectors 27, 28.

As shown in FIGS. 11-18, the plurality of reflectors 16 include a third plurality of reflectors 34 that are coupled to respective portions of the outer surface 20 of the translucent portion 18. In some embodiments, about one half of the reflectors 16 may be third reflectors 34 that are coupled to respective portions of the outer surface 20 of the translucent portion 18. In some such embodiments, a third reflector 34 may be coupled to the outer surface 20 and at least one other reflector 16 (such as at least one other third refractor 34) and/or at least one refractor 14 (such as at least one third refractor 30). In some such embodiments, some of the third reflectors 34 may each be coupled to a plurality of refractors 14 (such as third refractors 30). At least some of the third reflectors 34 may overlap, at least partially, at least one refractor 14 (such as at least one third refractor 30), as shown in FIGS. 11-18. For example, a third reflector 34 may be coupled to the top side 21, the bottom side 22 and/or a lateral side of another reflector 14 (e.g., a third refractor 30). In this way, a third refractor 34 may be coupled to the outer surface 20, and at least one other refractor 14, which may, potentially, also be coupled to the outer surface 20. In some embodiments, a third reflector 34 may be coupled to at least one other reflector 14, such as at least one other third reflector 34. As also shown in shown in FIGS. 1, 2 and 6-18, in the exemplary illustrated embodiment the third reflectors 34 are arranged in a singular fashion or in pairs of third reflectors 34. The third refractors 34 may include at least one of the first reflectors 27 of the first size and/or at least one of the second reflectors 28 of the second size, as shown FIGS. 1-18.

As also shown in FIGS. 11-18, the plurality of reflectors 16 may also include a plurality of fourth reflectors 36 that are not coupled to the outer surface 20 of the translucent portion 18. A fourth reflector 36 of the plurality of reflectors 16 may be coupled to at least one reflector 14 (such as at least one third and/or fourth refractor 30, 32) and/or to at least one other reflector 16 (e.g., at least one third reflector 34) that is coupled to the outer surface 20, but itself not coupled to the outer surface 20. In some embodiments, about one half of the reflectors 16 may be fourth reflectors 36 that are not coupled to the outer surface 20 of the translucent portion 18. In the exemplary illustrated embodiment shown in FIGS. 1, 2 and 6-18, a plurality of reflectors 16 are fourth reflectors 36 that are not coupled to the outer surface 20, and are each coupled to at least one third refractor 30. As also shown in shown in FIGS. 1, 2 and 6-18, in the exemplary illustrated embodiment, the fourth reflectors 36 are arranged in a singular fashion or in pairs of fourth reflectors 36. It is noted that a fourth reflector 36 may abut at least one other fourth reflector 36 and/or be coupled to at least one third reflector 34. The fourth refractors 36 may include at least one of the first reflectors 27 of the first size and/or at least one of the second reflectors 28 of the second size, as shown FIGS. 1-18.

The third reflectors 34 may be coupled to the outer surface 20 (and potentially to at least one reflector 14 and/or at least one other refractor 16) via an adhesive, glue or other binding or bonding agent or material. For example, in some embodiments, the third reflectors 34 may be coupled to the outer surface 20 (and potentially to at least one other reflector 16 and/or at least one refractor 14) via a translucent adhesive (e.g., a transparent adhesive). Similarly, the fourth reflectors 36 may be coupled to at least one other reflector 16 and/or at least one refractor 14 via an adhesive, glue or other binding or bonding agent or material. For example, in some embodiments, the fourth reflectors 36 may be coupled to at least one other reflector 16 and/or at least one refractor 14 via a translucent adhesive (e.g., a transparent adhesive). In some exemplary embodiments, the third reflectors 34 may be coupled to the outer surface 20 (and potentially to at least one other reflector 14 and/or at least one refractor 16), and/or the fourth reflectors 36 may be coupled to at least one other reflector 16 and/or at least one refractor 14, via a translucent epoxy, translucent acrylic adhesive, translucent cyanoacrylate adhesive (e.g., an ethyl-based cyanoacrylate adhesive) or modified silicone (MS) polymer adhesive. In some embodiments, the adhesive may be a UV curable adhesive or epoxy. In some embodiments, the translucent adhesive allows at least 10%, or at least 25%, or at least 40%, or at least 50%, or at least 75%, or at least 95% of incident light within the visible spectrum to pass therethrough. In some embodiments, the third reflectors 34 may be in physical contact with the outer surface 20 (and potentially in physical contact with at least one other reflector 14 and/or at least one refractor 16), and/or the fourth reflectors 36 may be in physical contact with at least one other reflector 16 and/or at least one refractor 14, such as via a translucent adhesive. In some embodiments, a third reflector 34 may be fused to the outer surface 20 (and potentially to at least one other reflector 14 and/or at least one refractor 16), and/or a fourth reflector 36 may be fused to at least one other reflector 16 and/or at least one refractor 14.

As shown in FIGS. 1-18, the array of the plurality of refractors 14 and the plurality of reflectors 16, and the translucent portion 18, are configured such that light passes to/therethrough a number of times, and is reflected and/or refracted (and potentially scattered) a number of times such that at least a portion of the light passes to/between the plurality of refractors and reflectors 14, 16 and the translucent portion 18 a number of times. The plurality of refractors and reflectors 14, 16, and the translucent portion 18, "bounce" incident light between the features, which modifies the light in various ways (e.g., in direction, speed, intensity, quality, spectrum, wavelength concentration/separation, etc.) to create a unique and visually appealing lighting scheme.

Another exemplary light refracting and reflecting device 110, which is incorporated into another exemplary system 150, according to the present disclosure is illustrated in FIGS. 19-23. The light refracting and reflecting device 110 is similar to the light refracting and reflecting device 10 of FIGS. 1-18, and the system 150 is similar to the 50 of FIGS. 1 and 2, and therefore like reference numerals preceded with "1" are used to indicate like components, aspects, functions or features, and the description directed thereto (including variations or alternative embodiments thereof) equally applies to the light refracting and reflecting device 110 and the system 150, and is not repeated here for brevity and clarity purposes.

Figure 19:
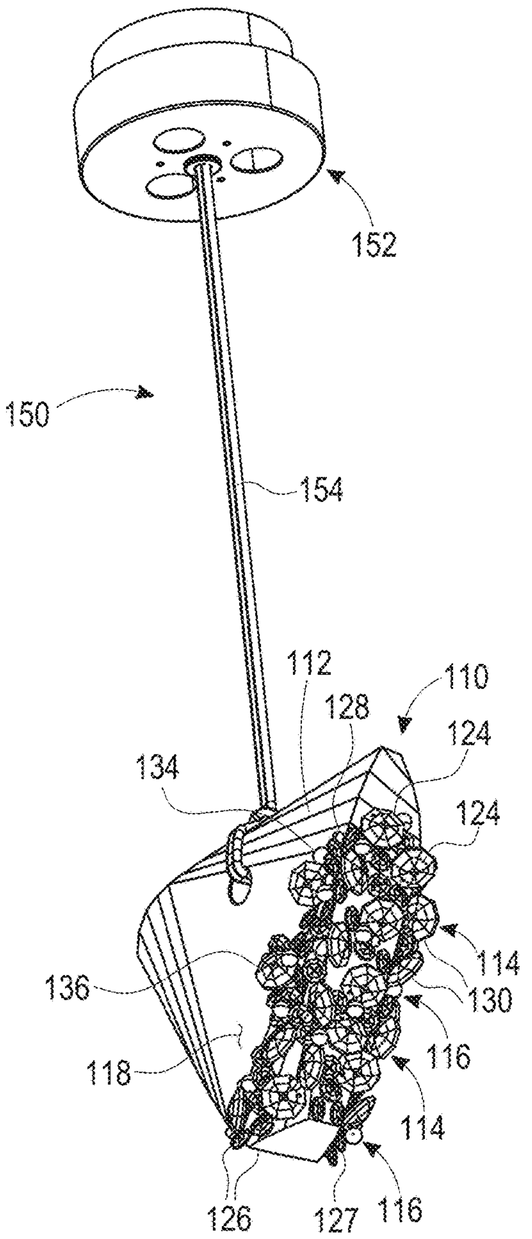
FIG. 19 is a front elevational perspective view of another system having a light reflecting and refracting device and a light emitting device, according to an embodiment of the present disclosure.
Figure 20:
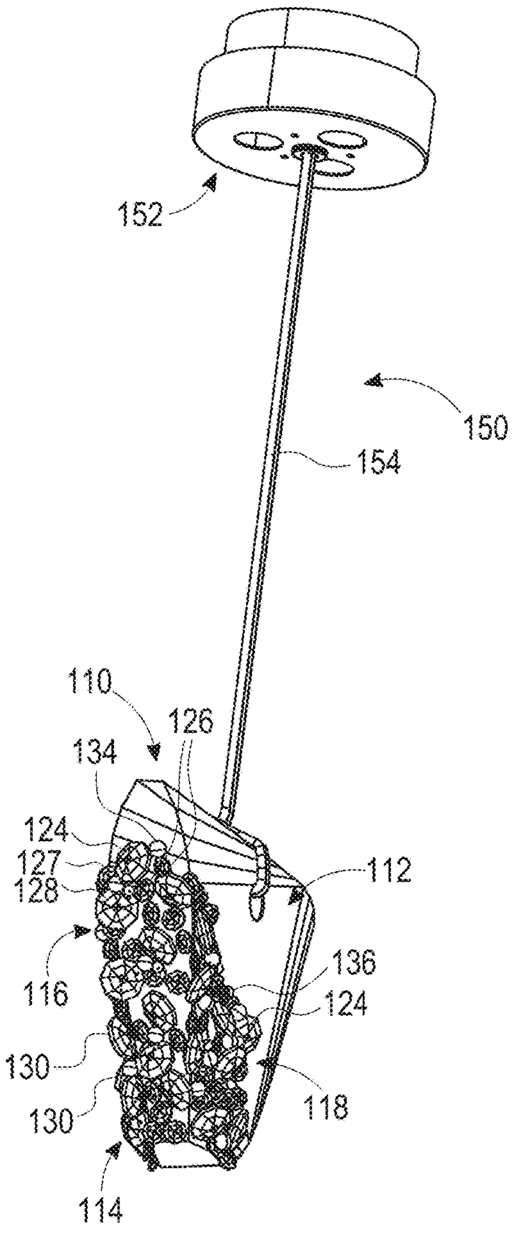
FIG. 20 is a back elevational perspective view of the system of FIG. 19, according to an embodiment of the present disclosure.
Figure 21:
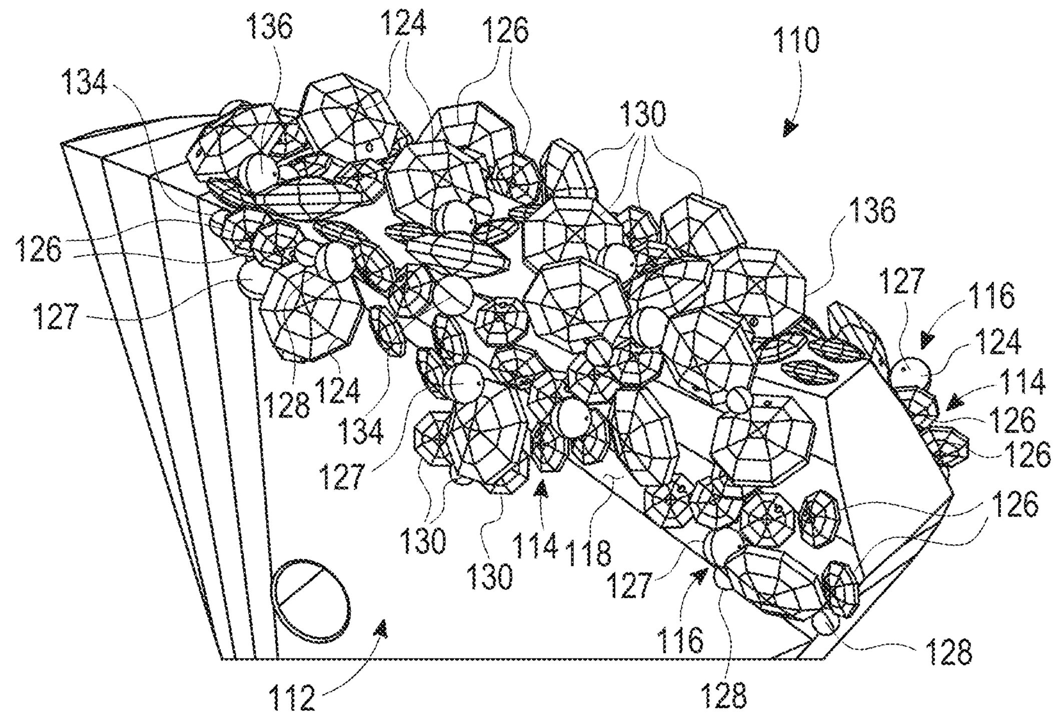
FIG. 21 is an elevational perspective view of a portion of the light reflecting and refracting device of FIG. 19, according to an embodiment of the present disclosure.
Figure 22:
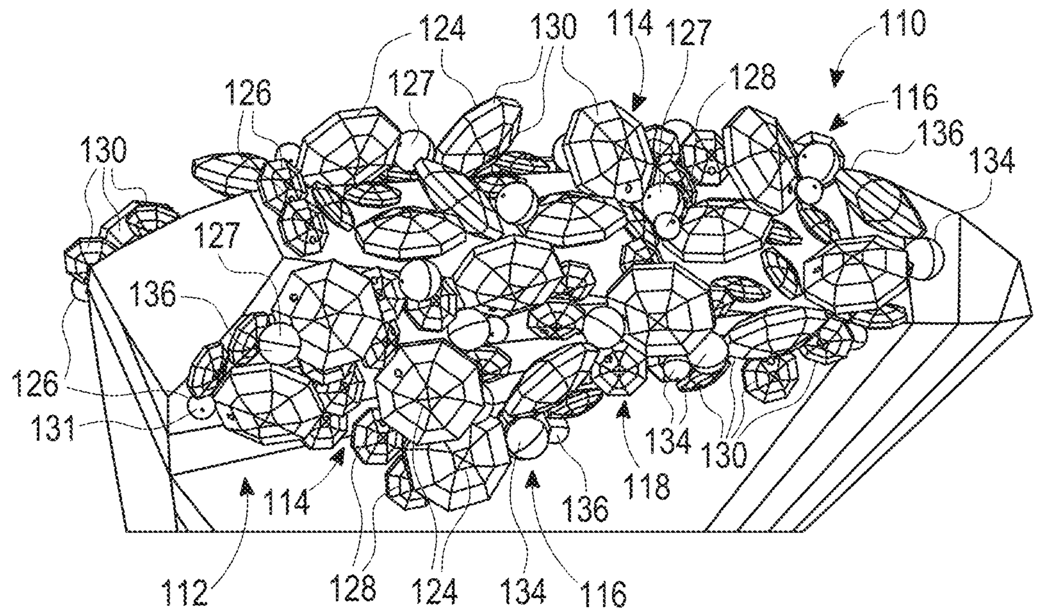
FIG. 22 is an elevational perspective view of a portion of the light reflecting and refracting device of FIG. 19, according to an embodiment of the present disclosure.
Figure 23:
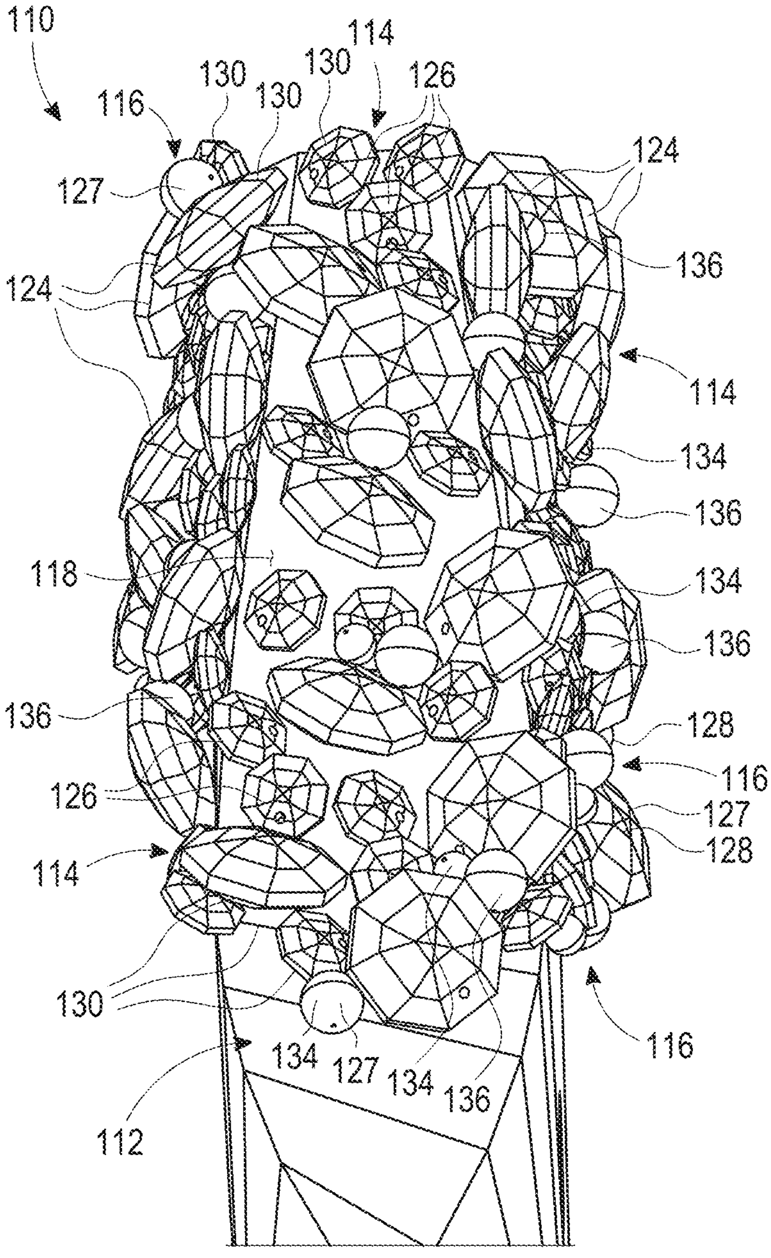
FIG. 23 is an elevational perspective view of a portion of the light reflecting and refracting device of FIG. 19, according to an embodiment of the present disclosure.
Figure 25:
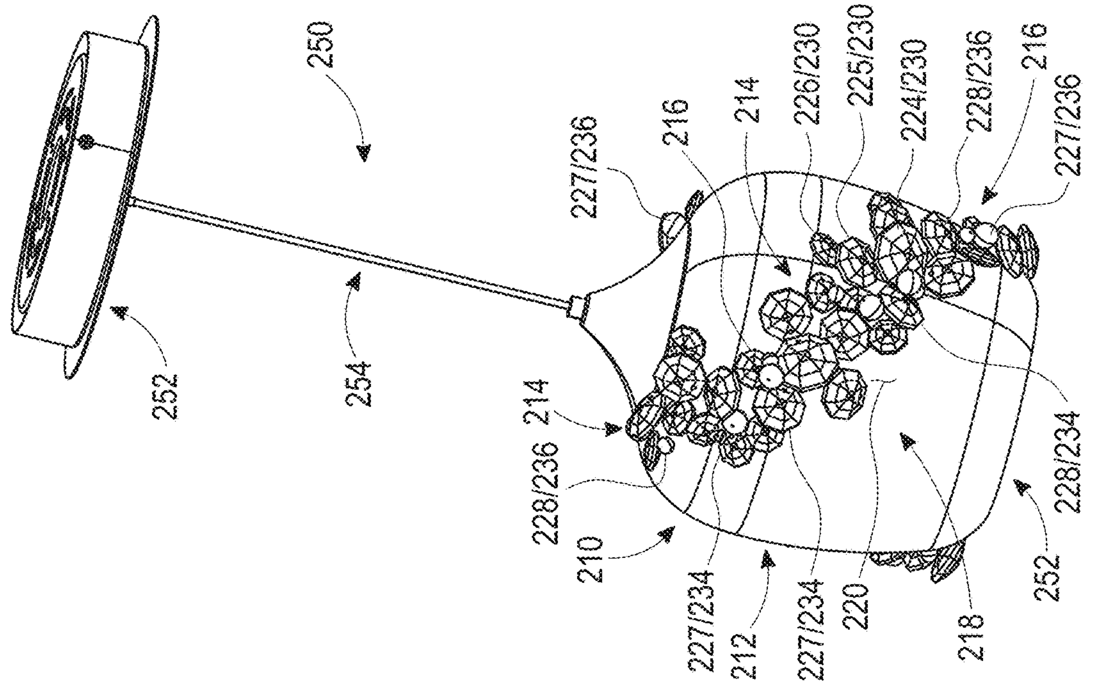
FIG. 25 is a back elevational perspective view of the system of FIG. 24, according to an embodiment of the present disclosure.
Figure 24:
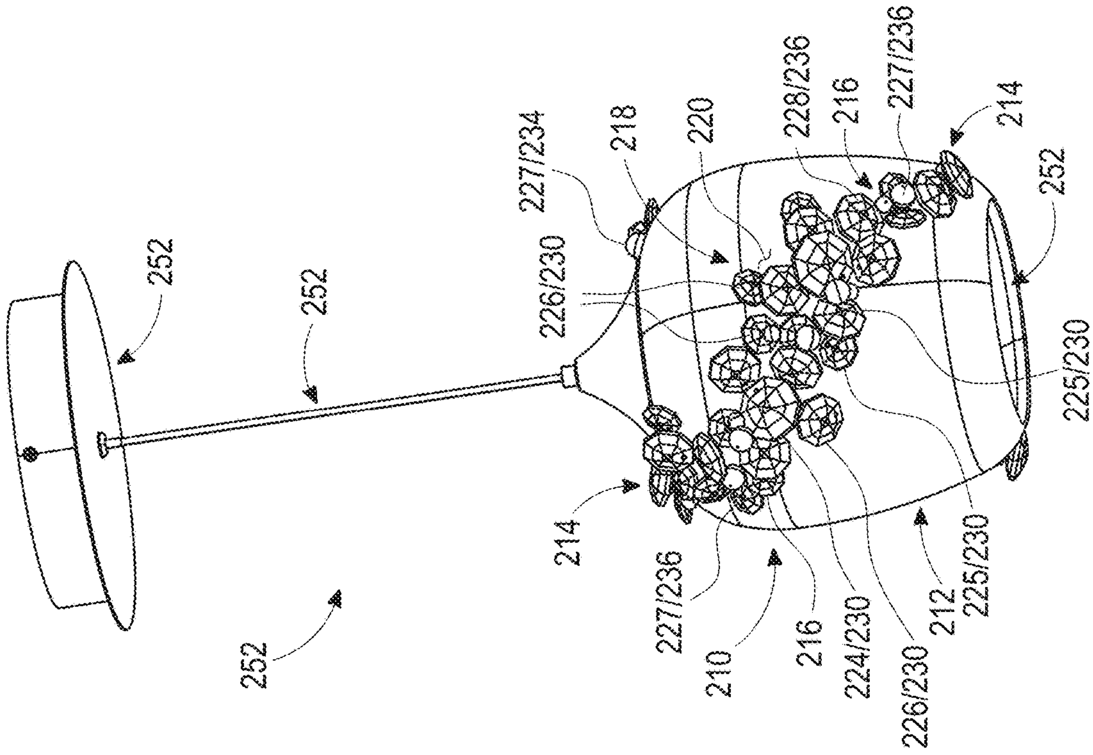
FIG. 24 is a front elevational perspective view of another system having a light reflecting and refracting device and a light emitting device, according to an embodiment of the present disclosure.
Figure 27:
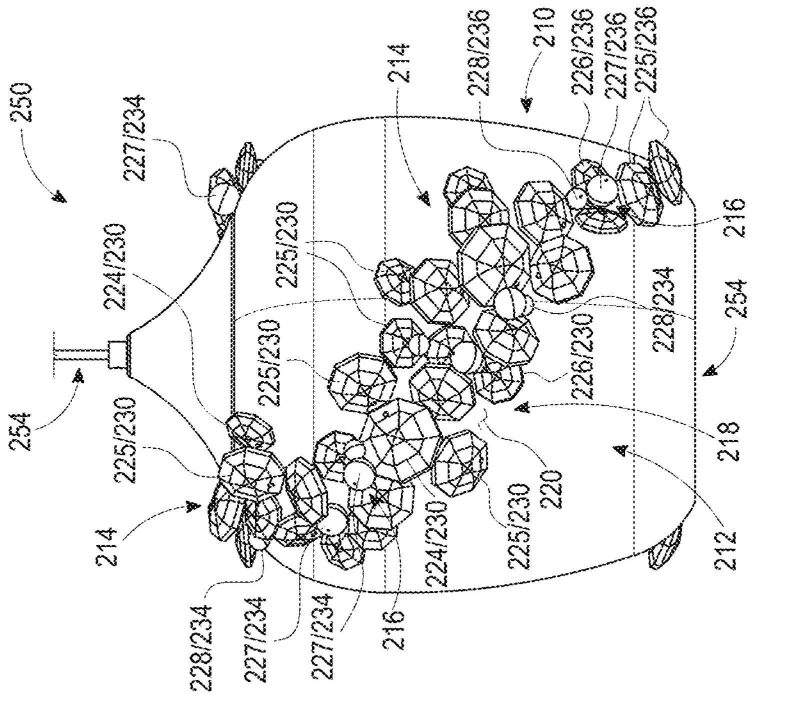
FIG. 27 is a back view of a portion of the light reflecting and refracting device of the system of FIG. 24, according to an embodiment of the present disclosure.
Figure 26:
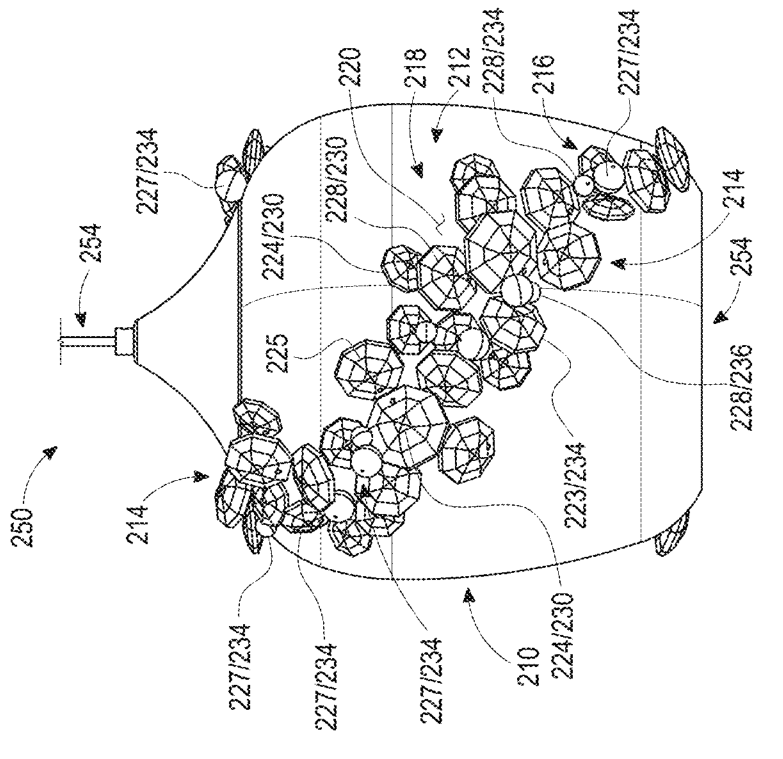
FIG. 26 is a front view of a portion of the light reflecting and refracting device of the system of FIG. 24, according to an embodiment of the present disclosure.
Figure 28:
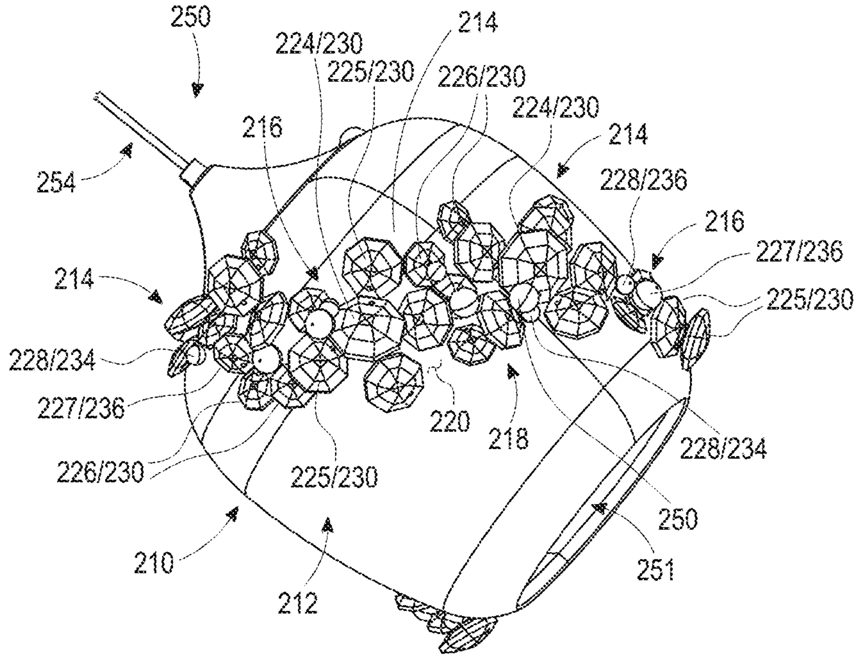
FIG. 28 is an elevational perspective view of a portion of the light reflecting and refracting device of the system of FIG. 24, according to an embodiment of the present disclosure.
Figure 29:
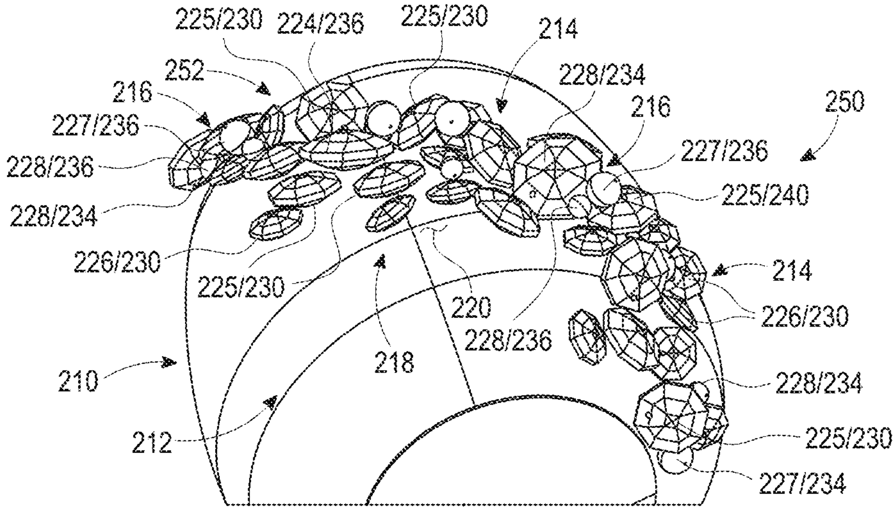
FIG. 29 is an elevational perspective view of a portion of the light reflecting and refracting device of the system of FIG. 24, according to an embodiment of the present disclosure.

As shown in FIGS. 19 and 20, the system 150 includes the device 110, a light emitting device 152 and a support 154 such that the device 150 is suspended from the light emitting device 152. The system 150 is thereby configured as a chandelier or pendant type light.

With reference to FIGS. 19-23, the light refracting and reflecting device 110 differs from the light refracting and reflecting device 110 in the configuration of the base 112/translucent portion 118 and the array of the plurality of refractors 114 and the plurality of reflectors 116. As shown in FIGS. 19 and 20, the base 12/translucent portion 18 is not annual, but rather triangular shaped. Further, the refractors 114 and the reflectors 116 are provided on a bottom side portion of the base 112/translucent portion 118. The bottom side portion of the base 112/translucent portion 118 may include a planar side surface that is angled downwardly, front and back planar faces, and rectilinear convex faceted surfaces extending therebetween. The system 150 is configured such that the light transmitted/emanating from the light emitting device 152 passes through the translucent portion 18 prior to reaching (and thereby interacting with) the refractors 114 and the reflectors 116.

With reference to FIGS. 19-23, the device 110 includes a greater ratio of reflectors 116 to refractors 114 than that of the device 10. Regarding the plurality of reflectors 116, as shown in FIGS. 19-23, the device 10 includes more first reflectors 127 than the second reflectors 128 (the first reflectors 127 being larger than the second reflectors 128). Further, the device 110 includes a greater number of the third reflectors 134 that are coupled to respective portions of the outer surface 120 of the translucent portion 118 than the number of fourth reflectors 136 that are not coupled to the outer surface 112 (and, instead, are coupled to at least one refractor 114 and/or at least one other reflector 116).

With reference to FIGS. 19-23, regarding the plurality of refractors 114, the device 110 includes more first refractors 124 than the second refractors 126 (the first refractors 124 being larger than the second refractors 126). Further, all of the refractors 114 of the device 110 are the third refractors 130 that are coupled to respective portions of the outer surface 120 of the translucent portion 118. That is, all of the refractors 114 of the device 110 are coupled to outer surface 120 of the translucent portion 118, and the device is void of a fourth refractor that is not coupled to outer surface (and is instead coupled to at least one other refractor 114 or at least one reflector 116).

Another exemplary light refracting and reflecting device 210, which is incorporated into another exemplary system 250, according to the present disclosure is illustrated in FIGS. 24-30. The light refracting and reflecting device 210 is similar to the light refracting and reflecting device 10 and device 110, and the system 250 is similar to the system 50 and the system 150, and therefore like reference numerals preceded with "2" are used to indicate like components, aspects, functions or features, and the description directed thereto (including variations or alternative embodiments thereof) equally applies to the light refracting and reflecting device 210 and the system 250, and is not repeated here for brevity and clarity purposes.

As shown in FIGS. 24-27, the system 250 includes the device 210, a light emitting device 252 and a support 254 such that the device 250 is suspended from the light emitting device 252. The system 250 is thereby configured as a chandelier or pendant type light.

With reference to FIGS. 24-30, the light refracting and reflecting device 210 differs from the light refracting and reflecting device 10 and the light refracting and reflecting device 110 in the configuration of the base 212/translucent portion 218 and the array of the plurality of refractors 214 and the plurality of reflectors 216. As shown in FIGS. 24-30, the base 112/translucent portion 118 is annual, but is extended along an axis of the inner aperture. Further, the array of the plurality of refractors 214 and the plurality of reflectors 216 are provided on two differing spaced portions of the exterior surface 220 of the base 212/translucent portion 218.

Figure 30:
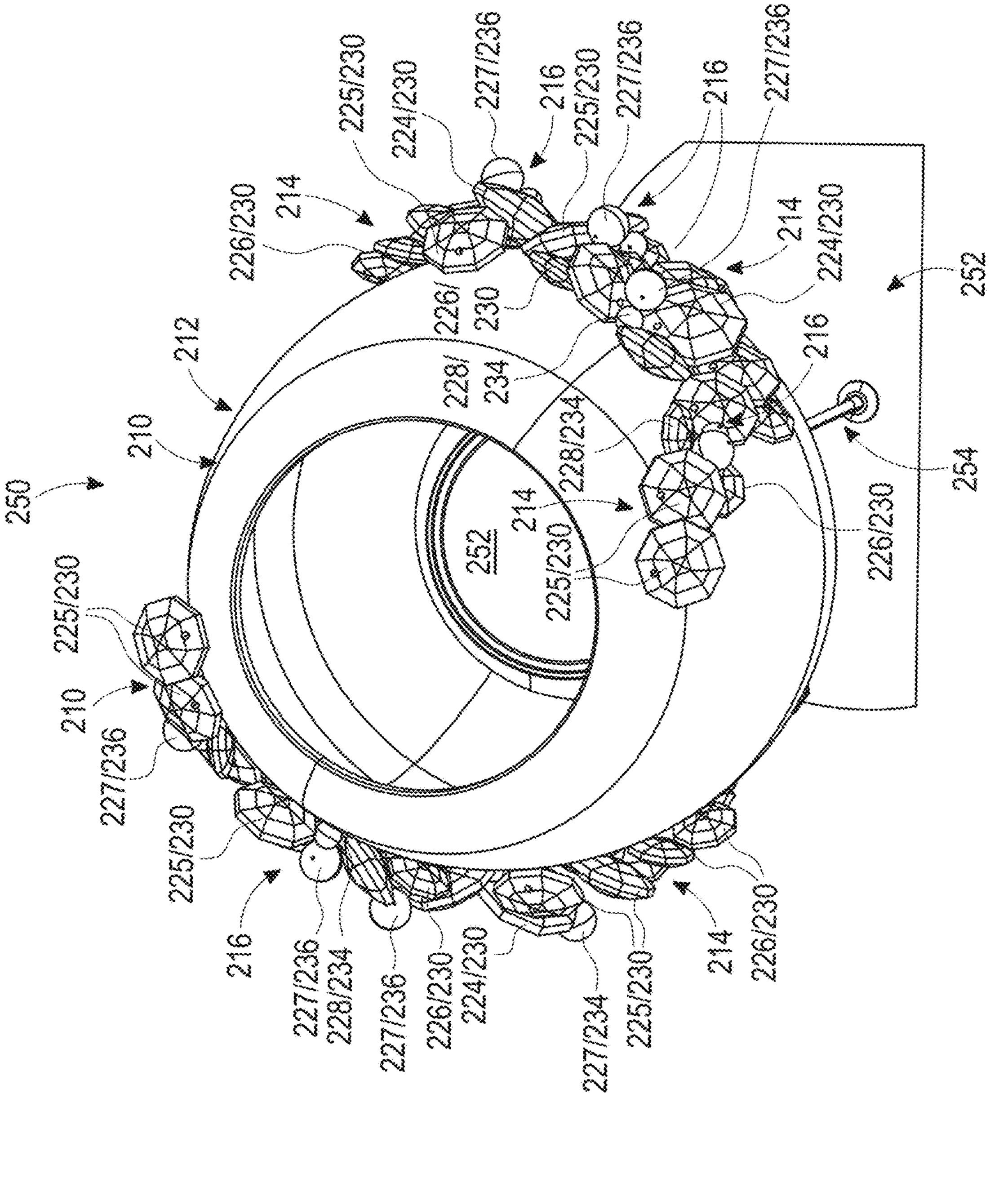
FIG. 30 is an elevational perspective view of a portion of the light reflecting and refracting device of the system of FIG. 24, according to an embodiment of the present disclosure.

Further, the light emitting device 252 differs from the light emitting device 52 and the light emitting device 152 in that the light emitting device 252 extends to within the inner aperture or cavity of the base 212/translucent portion 218 such that light emanates/transmits from within the aperture or cavity within the base 212/translucent portion 218, and through the base 212/translucent portion 218, as shown in FIG. 30. Further, as the plurality of refractors 214 and the plurality of reflectors 216 are positioned on or past the exterior surface 220 of the base 212/translucent portion 218, the transmitted light must pass through the base 212/translucent portion 218 to reach, and interact with, the refractors 214 and the reflectors 216.

As shown in FIGS. 24-30, the device 210 includes a first array 242 with a plurality of the refractors 214 and a plurality of the reflectors 216 supported by a first portion of the outer/exterior surface 220 of the base 212/translucent portion 218, and a second array 244 with a plurality of the refractors 214 and a plurality of the reflectors 216 supported by a second portion of the outer/exterior surface 220 of the base 212/translucent portion 218 that is spaced (e.g., circumferentially) from the first array 242. In the exemplary illustrated embodiment, the first and second arrays 242, 244 of the refractors 214 and the reflectors 216 are substantially the same or similar such that the arrangement and configuration of the refractors 214 and the reflectors 216 thereof is substantially the same. However, in some alternative embodiments, the first and second arrays 242, 244 may differ in the arrangement and/or configuration of the refractors 214 and the reflectors 216.

As also shown in FIGS. 24-30, the relative greater size of the first refractors 224 as compared to the second refractors 226 is less than that of the first and second refractors 24, 26 of the device 10, and the first and second refractors 124, 146 of the device 110. The plurality of refractors 14 also include a plurality of third refractors 225 of a third size that differs from the first size of the first refractors 224 and the second size of the second refractors 226, as shown in FIGS. 24-30. In some embodiments, the third refractors 225 may be larger than the second refractors 226 and smaller than the first refractors 224. For example, at least one dimension of the third refractors 225 may be greater than the corresponding dimension of the second refractors 226 and less than the corresponding dimension of the first refractors 224. In some embodiments, the first, second and third refractors 224, 226, 225 may be of the same shape, as shown in FIGS. 24-30. The illustrated exemplary device 210 includes a plurality of the first reflectors 224 provided on the translucent portion 218, a plurality of the second reflectors 226 provided on the translucent portion 18 and a plurality of the third reflectors 225 provided on the translucent portion 218, with the first reflectors 224 being larger octagonal glass crystals than the second and third reflectors 226, 225 and the third reflectors 225 being larger octagonal glass crystals than the second reflectors 226. Further, all of the refractors 214 of the device 210 are third refractors 230 that are coupled to respective portions of the outer surface 220 of the translucent portion 218. That is, all of the refractors 214 of the device 210 are coupled to outer surface 220 of the translucent portion 218, and the device 210 is void of a fourth refractor that is not coupled to outer surface 218 (and is instead coupled to at least one other refractor 214 or at least one reflector 216).

Another exemplary light refracting and reflecting device 310, which is incorporated into another exemplary system 350, according to the present disclosure is illustrated in FIGS. 31-37. The light refracting and reflecting device 310 is similar to the light refracting and reflecting device 10, the device 110 and the device 210, and the system 350 is similar to the system 50, the system 150 and the system 250, and therefore like reference numerals preceded with "3" are used to indicate like components, aspects, functions or features, and the description directed thereto (including variations or alternative embodiments thereof) equally applies to the light refracting and reflecting device 310 and the system 350, and is not repeated here for brevity and clarity purposes.

Figure 32:
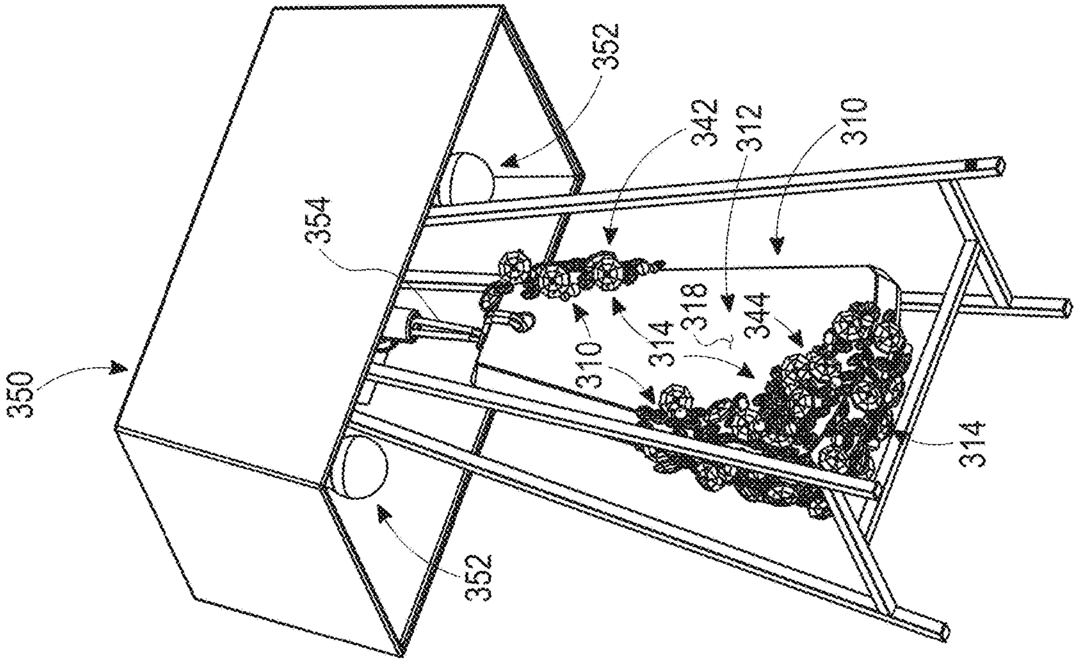
FIG. 32 is a back elevational perspective view of the system of FIG. 31, according to an embodiment of the present disclosure.
Figure 31:
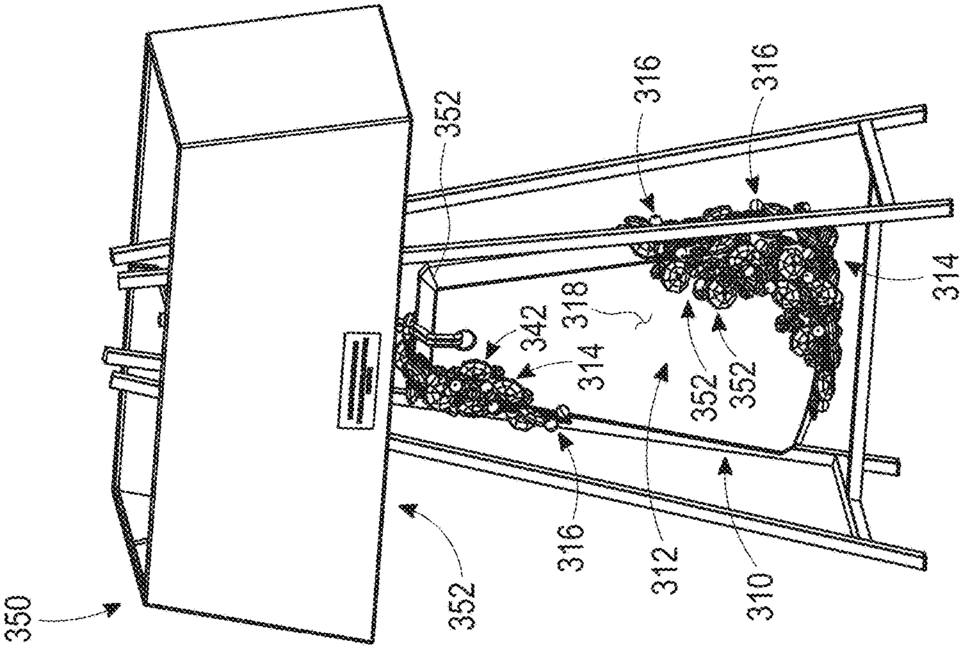
FIG. 31 is a front elevational perspective view of another system having a light reflecting and refracting device and a light emitting device, according to an embodiment of the present disclosure.
Figure 34:
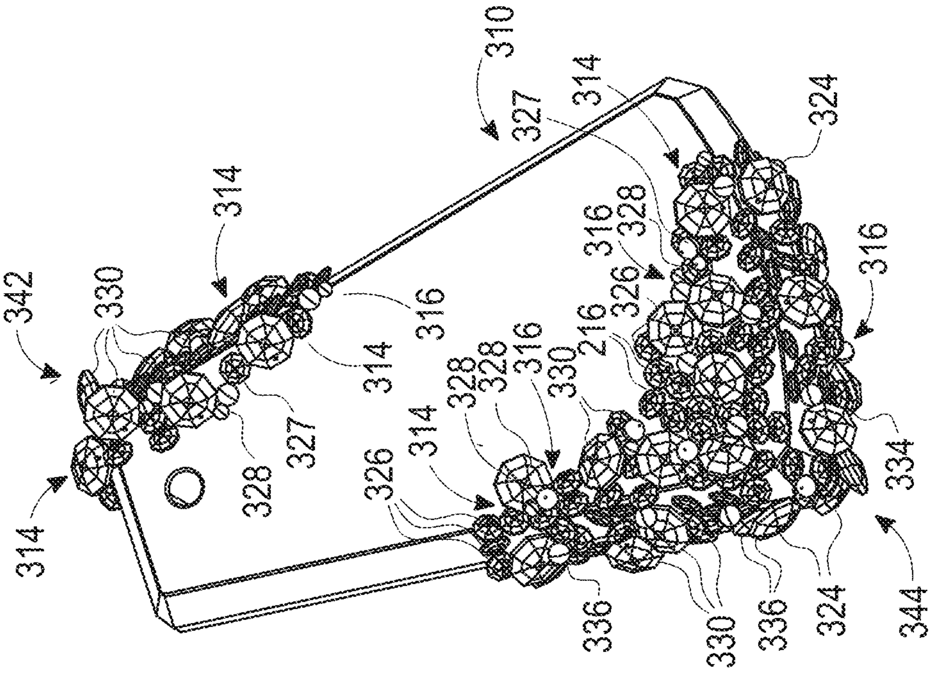
FIG. 34 is a back elevational perspective view of the light reflecting and refracting device of FIG. 33, according to an embodiment of the present disclosure.
Figure 33:
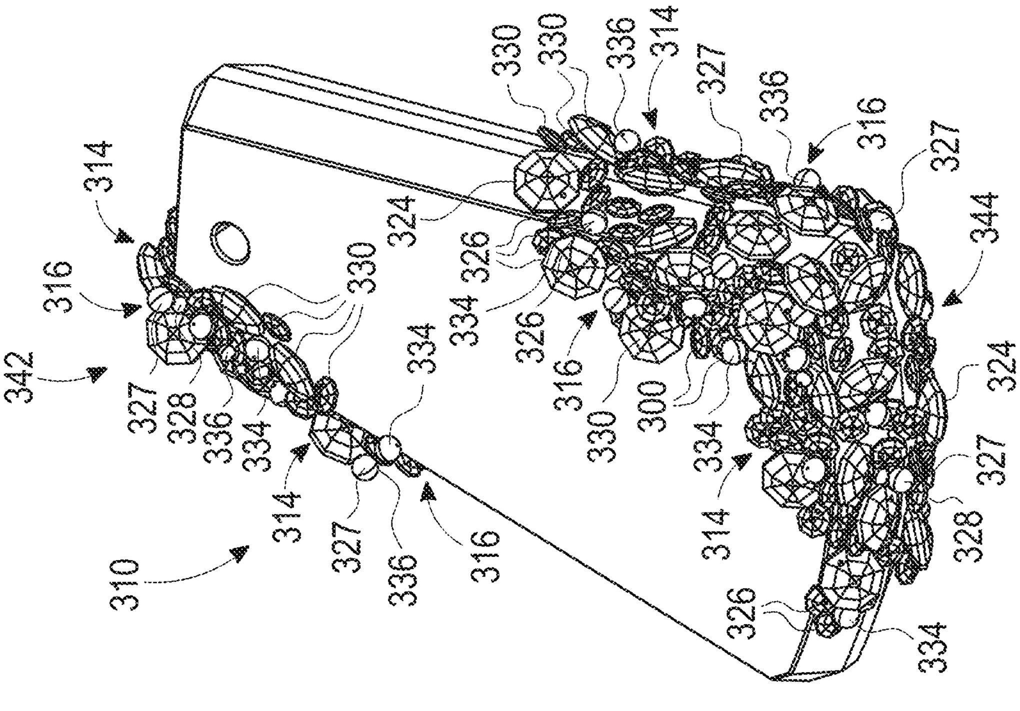
FIG. 33 is front elevational perspective view of the light reflecting and refracting device of the system of FIG. 31, according to an embodiment of the present disclosure.
Figure 35:
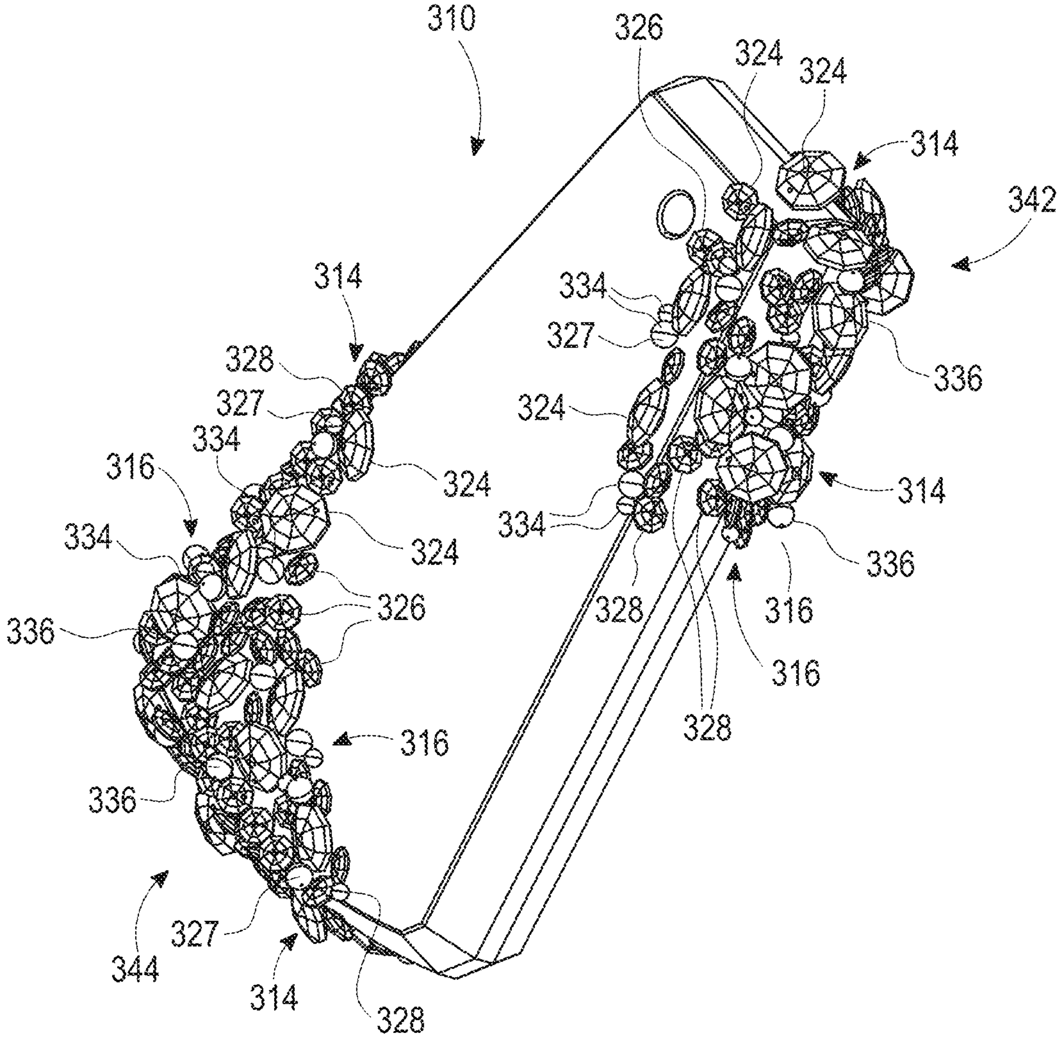
FIG. 35 is another back elevational perspective view of the light reflecting and refracting device of FIG. 33, according to an embodiment of the present disclosure.
Figure 36:
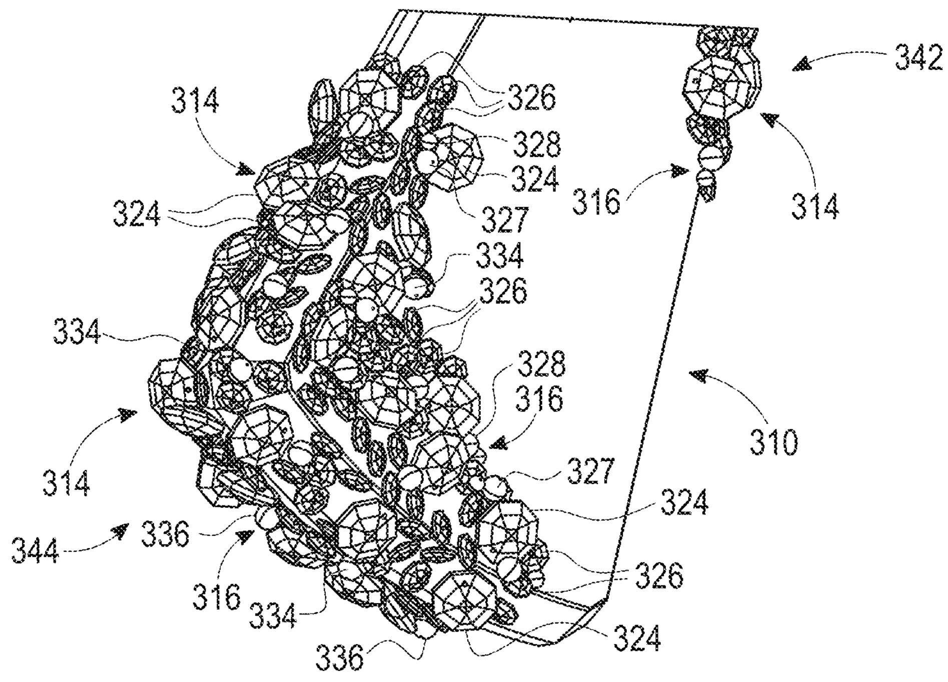
FIG. 36 is a perspective view of a portion of the light reflecting and refracting device of FIG. 33, according to an embodiment of the present disclosure.
Figure 37:
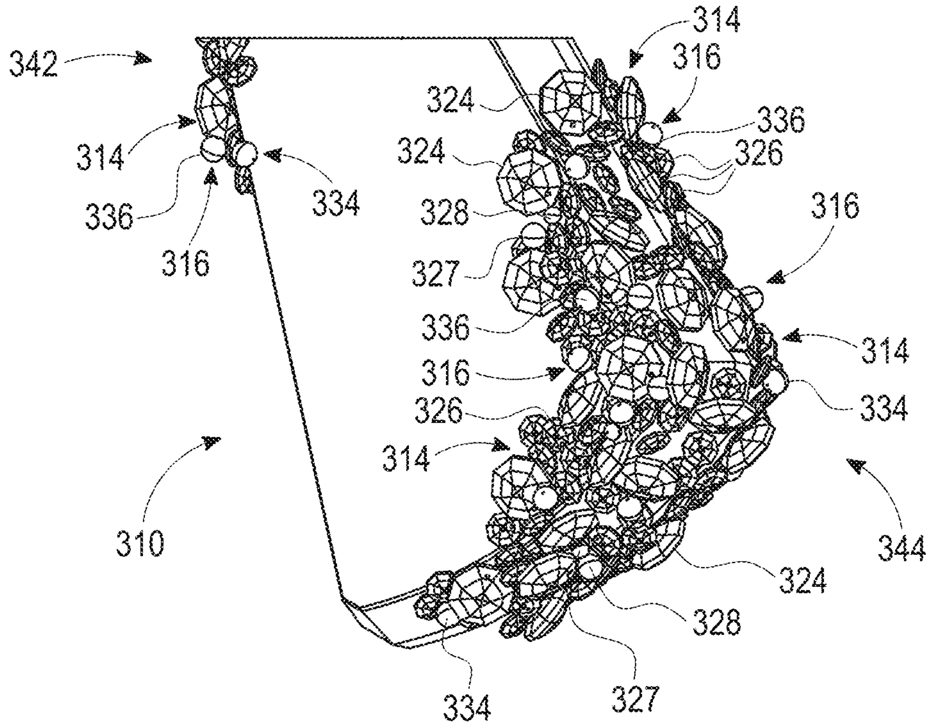
FIG. 37 is a perspective view of a portion of the light reflecting and refracting device of FIG. 33, according to an embodiment of the present disclosure.

As shown in FIGS. 31 and 32, the system 350 includes the device 310, a light emitting device 352 and a support 354 such that the device 250 is suspended from the light emitting device 252. The system 350 differs from the system 50, the system 150 and the system 250 in that the base 312/translucent portion 318 is not annular, and that the system 350 further includes a frame 356 that supports the light emitting device 352, the support 354 and the device 310. As shown in FIGS. 31 and 32, the frame 356 configures the system 350 as lamp (such as a table lamp or a floor lamp).

With reference to FIGS. 31-37, the light refracting and reflecting device 310 differs from the light refracting and reflecting device 10, the light refracting and reflecting device 110 and the light refracting and reflecting device 210 in the array of the plurality of refractors 314 and the plurality of reflectors 316. The device 310 includes a first array 342 of the plurality of refractors 314 and the plurality of reflectors 316 supported by a first portion of the outer/exterior surface 320 of the base 312/translucent portion 318, and a second array 344 of the plurality of refractors 314 and the plurality of reflectors 316 supported by a second portion of the outer/exterior surface 320 of the base 312/translucent portion 318 that is spaced from the first array 342. In the exemplary illustrated embodiment, the first and second arrays 342, 344 of the refractors 314 and the reflectors 316 are provided on opposing corner portions of the base 312/translucent portion 318, and differ in the arrangement and/or configuration of the refractors 314 and the reflectors 316 thereof. For example, as shown in FIGS. 31-37, the first array 342 contains fewer refractors 314 and fewer reflectors 316 than the refractors 314 and reflectors 316 of the second array 344. Further, the arrangement or configuration of the refractors 314 and the reflectors 316 of the first array 342 differs from those of the second array 344.

As also shown in FIGS. 31-37, the first refractors 324 are substantially larger than the second refractors 326, and the device 310 includes more second refractors 326 than first refractors 324. Further, all of the refractors 314 of the device 310 are the third refractors 330 that are coupled to respective portions of the outer surface 320 of the translucent portion 318. That is, all of the refractors 314 of the device 310 are coupled to outer surface 320 of the translucent portion 318, and the device 310 is void of a fourth refractor that is not coupled to outer surface 318 (and is instead coupled to at least one other refractor 314 or at least one reflector 316). As also shown in FIGS. 31-37, the first refractors 324 and the second refractors 326 are further spaced from each other, on average or in total, than those of the device 10, the device 110 and the device 210.

Another exemplary light refracting and reflecting device 410, which is incorporated into another exemplary system 450, according to the present disclosure is illustrated in FIGS. 38-43. The light refracting and reflecting device 410 is similar to the light refracting and reflecting device 10, the device 110, the device 210 and the device 310, and the system 450 is similar to the system 50, the system 150, the system 250 and the system 350, and therefore like reference numerals preceded with "4" are used to indicate like components, aspects, functions or features, and the description directed thereto (including variations or alternative embodiments thereof) equally applies to the light refracting and reflecting device 410 and system 450, and is not repeated here for brevity and clarity purposes.

Figure 39:
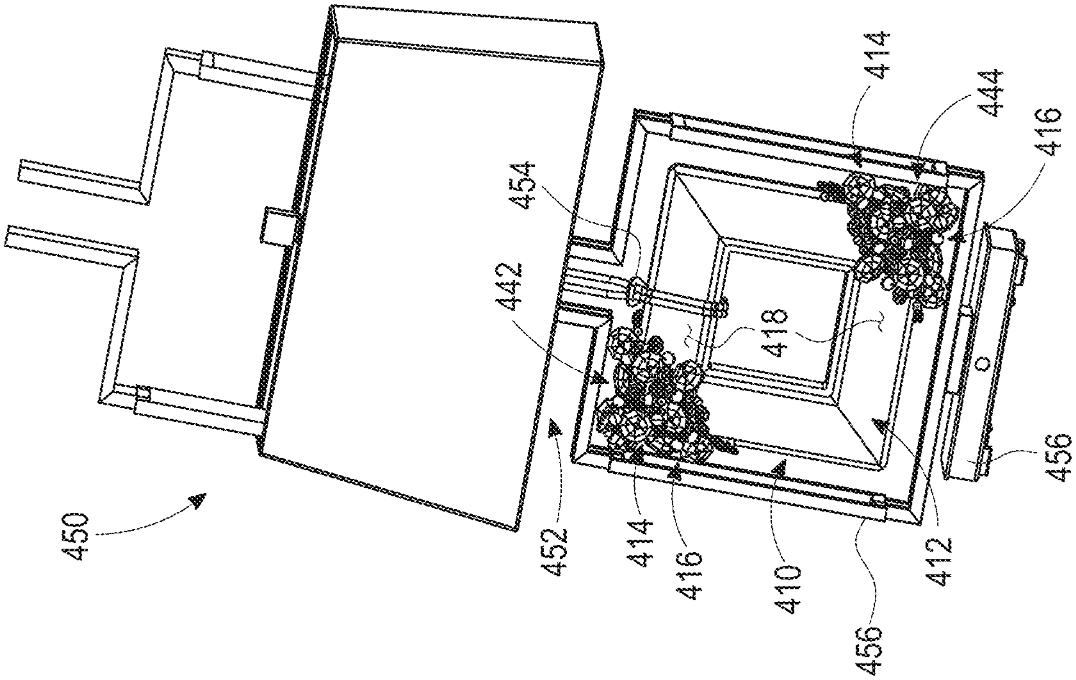
FIG. 39 is a back elevational perspective view of the system of FIG. 38, according to an embodiment of the present disclosure.
Figure 38:
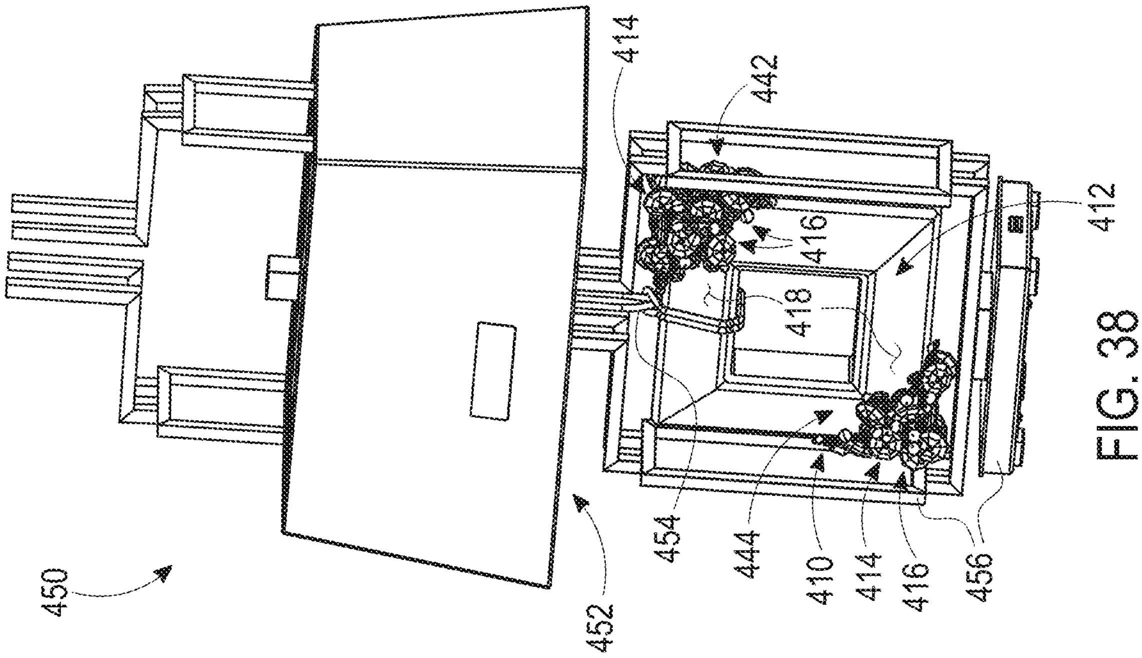
FIG. 38 is a front elevational perspective view of another system having a light reflecting and refracting device and a light emitting device, according to an embodiment of the present disclosure.
Figure 41:
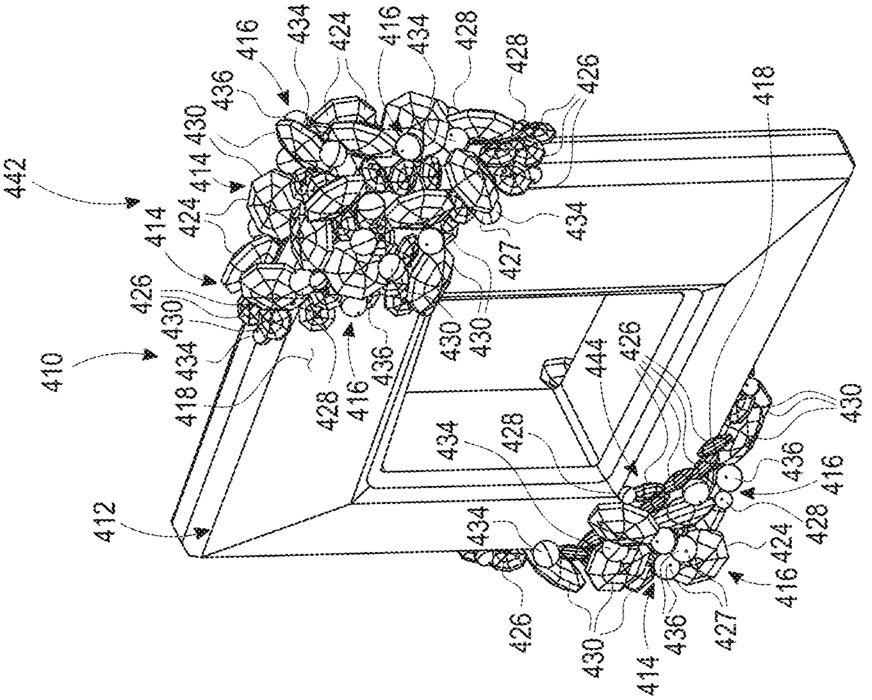
FIG. 41 is a front elevational perspective view of the light reflecting and refracting device of FIG. 40, according to an embodiment of the present disclosure.
Figure 40:
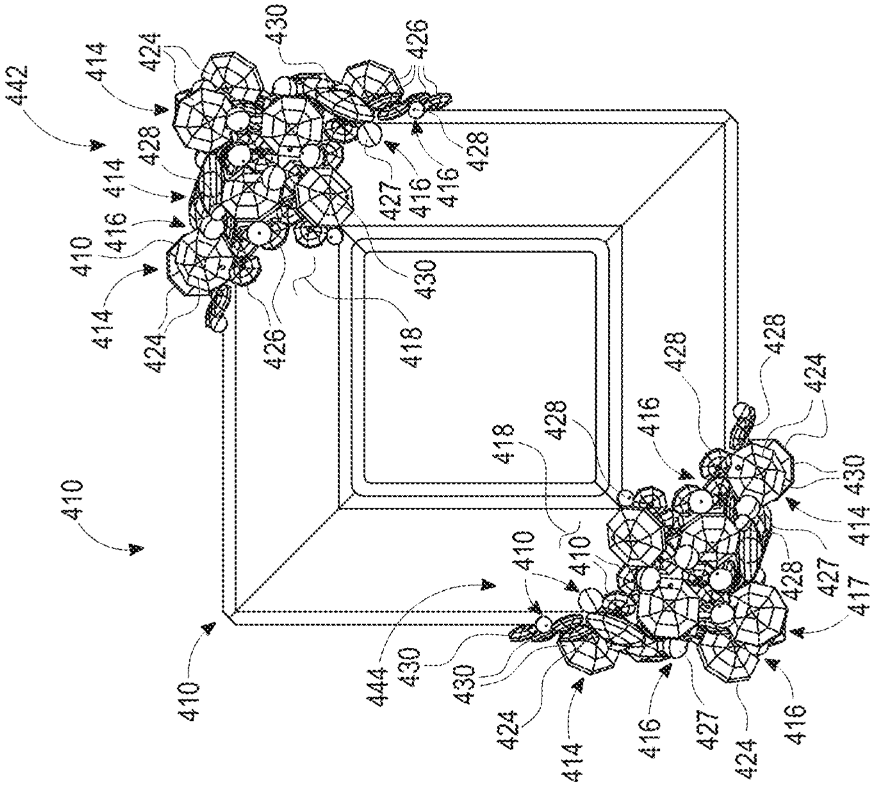
FIG. 40 is front view of the light reflecting and refracting device of the system of FIG. 38, according to an embodiment of the present disclosure.
Figure 42:
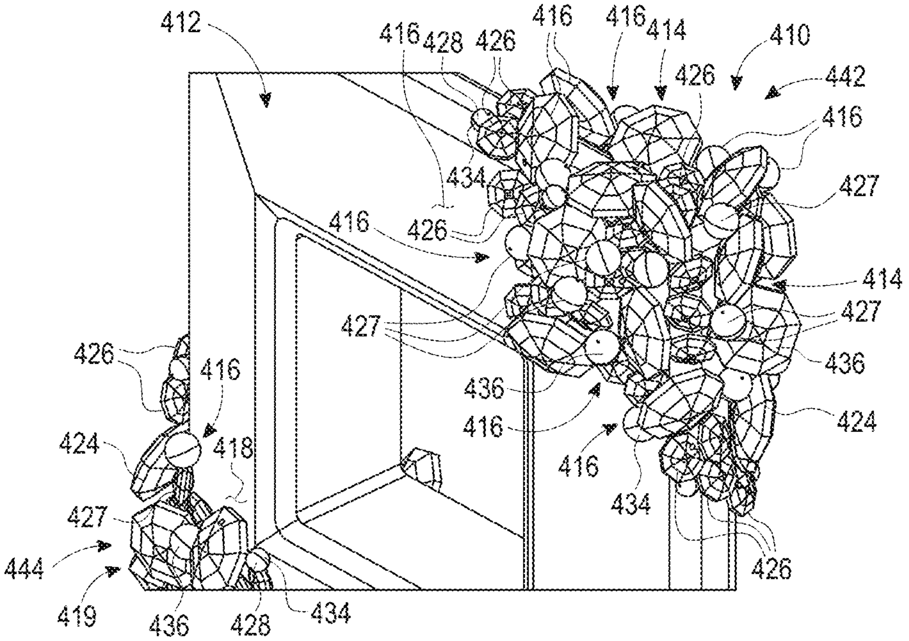
FIG. 42 is a front elevational perspective view of a portion of the light reflecting and refracting device of FIG. 40, according to an embodiment of the present disclosure.
Figure 43:
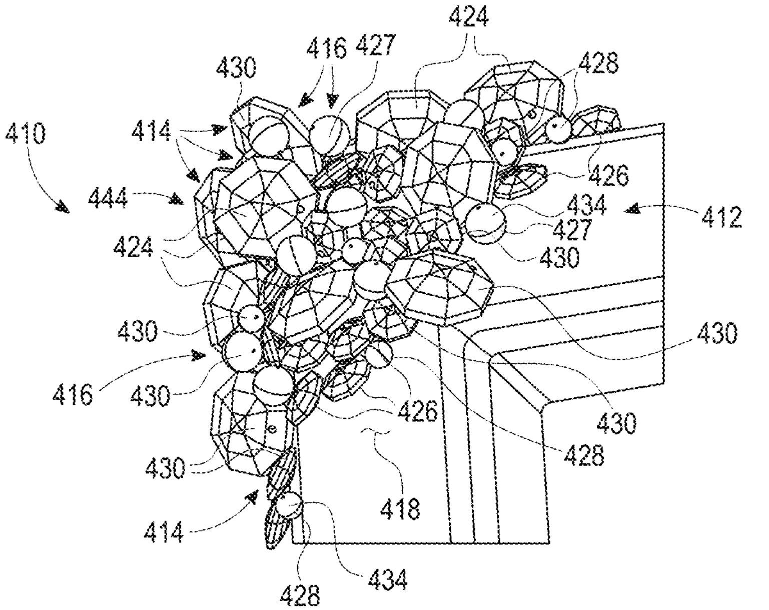
FIG. 43 is a back elevational perspective view of a portion of the light reflecting and refracting device of FIG. 40, according to an embodiment of the present disclosure.

As shown in FIGS. 38 and 39, the system 450 includes the device 410, a light emitting device 452, a support 454 and a frame 456. As shown in FIGS. 38 and 39, the system 450 is configured as a lamp (such as a table lamp or a floor lamp). The base 412/translucent portion 418 comprises a rectilinear annular shape, such as a square or rectangular shape.

With reference to FIGS. 38-43, the light refracting and reflecting device 410 differs from the light refracting and reflecting device 10, the light refracting and reflecting device 110, the light refracting and reflecting device 210 and the light refracting and reflecting device 310 in the arrays of the plurality of refractors 414 and the plurality of reflectors 416. The device 410 includes a first array 442 of a plurality of the refractors 414 and a plurality of the reflectors 416 on a first corner portion of the outer/exterior surface 420 of the base 412/translucent portion 418, and a second array 444 of a plurality of the refractors 414 and a plurality of the reflectors 416 on a second corner portion of the outer/exterior surface 420 of the base 412/translucent portion 418. In the exemplary illustrated embodiment, the first and second arrays 442, 444 of the refractors 414 and the reflectors 416 are provided on opposing corner portions of the base 412/ translucent portion 418, and are the same or substantially similar in the arrangement and/or configuration of the refractors 414 and the reflectors 416 thereof.

As also shown in FIGS. 38-43, the first refractors 424 are substantially larger than the second refractors 426, and the device 410 includes more second refractors 426 than first refractors 424. Further, all of the refractors 414 of the device 410 are the third refractors 430 that are coupled to respective portions of the outer surface 420 of the translucent portion 418. That is, all of the refractors 414 of the device 410 are coupled to outer surface 420 of the translucent portion 418, and the device 310 is void of a fourth refractor that is not coupled to outer surface 418 (and is instead coupled to at least one other refractor 4414 or at least one reflector 416).

As also shown in FIGS. 38-43, at least some of the second refractors 426 are provided in clusters of a plurality of adjacent refractors 426. Further, a majority of the reflectors 416 are configured as fourth reflectors 436 that are coupled to at least one refractor 414 (such as at least one third refractor 430) and/or to at least one other reflector 416 that is coupled to the outer surface 420, but are not themselves coupled to the outer surface 420. It is also noted that the refractors 414 and the reflectors 416 of the first and second arrays 442, 444 are relatively tightly arranged together.

As may be recognized by those of ordinary skill in the art based on the teachings herein, numerous changes and modifications may be made to the above-described and other embodiments of the present disclosure without departing from the scope of the disclosure. The components of the light refracting and reflecting devices as disclosed in the specification, including the accompanying abstract and drawings, may be replaced by alternative component(s) or feature(s), such as those disclosed in differing embodiments, which serve the same, equivalent or similar purpose as known by those skilled in the art to achieve the same, equivalent or similar results by such alternative component(s) or feature(s) to provide a similar function for the intended purpose. For example, the above-described examples (and/or aspects thereof), or features thereof, may be used in combination with each other. For example, one feature, component, sub-assembly, configuration, component shape, arrangement or the like, of one or more embodiment, may be equally employed or employed in a functional fashion to a different embodiment. Accordingly, the features of each of the disclosed device and system embodiments are hereby disclosed with respect to each other disclosed device and system embodiment, and the features thereof may be combined, swapped, duplicated, etc. It is hereby contemplated that the arrangement and configuration of the array(s) of reflectors and refractors of one embodiment, or a portion thereof, may be equally or similarly employed in another embodiment. Similarly, it is hereby contemplated that the base and/or translucent portion of one embodiment, or a portion thereof, may be equally or similarly employed in another embodiment. In addition, the devices and systems may include more or fewer components or features (e.g., reflectors and/or refractors) than the embodiments as described and illustrated herein. Accordingly, this detailed description of some illustrative embodiments of the inventions is to be taken in a demonstrative, as opposed to limiting, sense.

It is to be understood that the above description is intended to be illustrative, and not restrictive. In addition, many modifications may be made to adapt a particular situation or material to the teachings of the various examples without departing from their scope. While dimensions and types of materials may be described herein, they are intended to define parameters of some of the various examples, and they are by no means limiting to all examples and are merely exemplary. Many other examples will be apparent to those of skill in the art upon reviewing the above description.

In the following claims, the terms "first," "second," and "third," etc. are used merely as referee labels, and are not intended to impose numerical, structural or other requirements on their objects.

While the disclosure has been described in detail in connection with only a limited number of examples, it should be readily understood that the disclosure is not limited to such disclosed examples. Rather, this disclosure can be modified to incorporate any number of variations, alterations, substitutions or equivalent arrangements not heretofore described, but which are commensurate with the spirit and scope of the disclosure. Additionally, while various examples have been described, it is to be understood that aspects of the disclosure may include only one example or some of the described examples. Also, while some embodiments are described as having a certain number of elements, it will be understood that the examples can be practiced with less than or greater than the certain number of elements.

The invention claimed is:

1. A device, comprising:

a base with a translucent portion having an outer surface;

a plurality of faceted, translucent refractors configured to refract incident light within a visible spectrum, the plurality of refractors being supported by the translucent portion; and a plurality of opaque, spherical reflectors configured to reflect incident light within the visible spectrum, the plurality of reflectors being supported by the translucent portion, wherein:

a first refractor of the plurality of refractors is coupled to the outer surface;

a first reflector of the plurality of reflectors is coupled to a refractor, and is not coupled to the outer surface; and a second reflector of the plurality of reflectors is coupled to a refractor and another reflector, and is not coupled to the outer surface.

2. The device of claim 1, wherein the first reflector is coupled to the first refractor.

3. The device of claim 2, wherein the second reflector is coupled to the first refractor.

4. The device of claim 3, wherein the second reflector is coupled to the first reflector.

5. The device of claim 1, wherein a second refractor is coupled to the outer surface, and wherein the first reflector is coupled to the first refractor and the second refractor.

6. The device of claim 5, wherein the second refractor is coupled to the first refractor.

7. The device of claim 1, wherein a second refractor is coupled to at least one of a refractor and a reflector, and is not coupled to the outer surface.

8. The device of claim 7, wherein the second refractor is coupled to the first refractor, and wherein the first reflector is coupled to the second refractor.

9. The device of claim 1, wherein refractors of a first plurality of refractors are each coupled to the outer surface.

10. The device of claim 9, wherein reflectors of a first plurality of reflectors are each coupled to a refractor of the first plurality of reflectors and not to the outer surface.

11. The device of claim 10, wherein the first plurality of reflectors comprises a plurality of reflectors of a first size and a plurality of reflectors of a second size that differs from the first size.

12. The device of claim 11, wherein the first plurality of refractors comprises a plurality of refractors of a first size and a plurality of refractors of a second size that differs from the first size.

13. The device of claim 10, wherein reflectors of a second plurality of reflectors are each coupled to the outer surface.

14. The device of claim 13, wherein more than one of the reflectors of the second plurality of reflectors are coupled to a refractor of the first plurality of refractors.

15. The device of claim 14, wherein:

the first plurality of refractors comprises a plurality of refractors of a first size and a plurality of refractors of a second size that differs from the first size;

the first plurality of reflectors comprises a plurality of reflectors of a third size and a plurality of reflectors of a fourth size that differs from the third size; and the second plurality of reflectors comprises a plurality of reflectors of a fifth size and a plurality of reflectors of a sixth size that differs from the fifth size.

16. The device of claim 1, wherein:

the first refractor is in physical contact with the outer surface via a translucent adhesive;

the first reflector is in physical contact with a refractor via a translucent adhesive; and the second reflector is in physical contact with a refractor via a translucent adhesive.

17. The device of claim 1, wherein:

each reflector of the plurality of reflectors is coupled to at least one of the outer surface, a refractor and another reflector via a translucent adhesive; and each refractor of the plurality of refractors is coupled to at least one of the outer surface, a reflector and another refractor via a translucent adhesive.

18. The device of claim 1, wherein:

the plurality of refractors comprises refractors of a first size and refractors of a second size that differs from the first size; and the plurality of reflectors comprises reflectors of a third size and reflectors of a fourth size that differs from the third size.

19. The device of claim 1, wherein the translucent portion is formed of crystal glass with a plurality of facets that refracts incident light within the visible spectrum.

20. The device of claim 1, wherein each refractor of the plurality of refractors comprises crystal glass.

21. The device of claim 20, wherein each refractor of the plurality of refractors is an octagonal glass crystal.

22. The device of claim 1, wherein each reflector of the plurality of reflectors comprises at least one of glass and acrylic.

23. The device of claim 1, wherein the plurality of reflectors comprises a first plurality of reflectors that have a first hue, and a second plurality of reflectors that have a second hue that differs from the first hue.

24. The device of claim 1, wherein each reflector of the plurality of reflectors comprises a reflection factor of at least 50% to light within the visible spectrum.

25. The device of claim 1, wherein at least 50% of the light reflected by each reflector of the plurality of reflectors is specular reflected light.

26. The device of claim 1, wherein:

the translucent portion is formed of glass;

each refractor of the plurality of refractors is formed of crystal glass;

the plurality of refractors comprises a plurality of refractors of a first size and a plurality of refractors of a second size that differs from the first size;

the plurality of refractors comprises a plurality of refractors coupled to the outer surface;

the plurality of reflectors comprises a plurality of reflectors of a third size and a plurality of reflectors of a fourth size that differs from the third size; and the plurality of reflectors comprises a plurality of reflectors coupled to the outer surface and a plurality of reflectors that are coupled to at least one of a refractor and another reflector and not coupled to the outer surface.

27. A system, comprising:
the device of claim 1; and
a light emitting device,
wherein light emitted from the light emitting device is incident on the outer surface of the translucent portion of the device, the plurality of refractors and the plurality of reflectors.

28. The system of claim 27, wherein light emitted from the light emitting device refracts through the plurality of refractors and reflects off the plurality of reflectors.

29. The device of claim 1, wherein the device comprises more of the refractors than the reflectors.

* * * * *